United States Patent [19]

Hoskinson et al.

[11] 4,361,754
[45] Nov. 30, 1982

[54] RECORD OPERATED CONTROL SYSTEM FOR A VENDING MACHINE

[75] Inventors: William R. Hoskinson, Elburn; Edward K. Miguel, DeKalb, both of Ill.

[73] Assignee: The Wurlitzer Company, DeKalb, Ill.

[21] Appl. No.: 200,951

[22] Filed: Oct. 27, 1980

[51] Int. Cl.³ ............................ G06K 5/00; G07F 7/08
[52] U.S. Cl. ................................. 235/381; 340/825.33
[58] Field of Search ............... 235/379, 380, 381, 382, 235/375, 431; 340/149 A, 152, 825.3, 825.33, 825.35; 194/4 F

[56] References Cited

U.S. PATENT DOCUMENTS 3,560,715 2/1971 Akamatsu et al. .................. 235/381
4,256,955 3/1981 Giraud et al. ....................... 235/381

*Primary Examiner*—Thomas A. Robinson
*Attorney, Agent, or Firm*—Trexler, Bushnell & Wolters Ltd.

[57] ABSTRACT

A record operated control system is provided for use with a vending machine and a record reading/writing apparatus having a read/write head for reading and writing data on a record during relative movement between the record and the read/write head. The control system includes a decoding circuit coupled with the read/write head for decoding data read from the record thereby. A data storage circuit is coupled with the decoding circuit for receiving and storing the decoded data. A comparing circuit compares at least a portion of the stored data to predetermined data and produces a compare signal if these data compare. A data altering circuit is responsive to the compare signal for altering the stored data in accordance with the amount of credit required to vend a selected item. An encoding circuit is coupled with the storage circuit and with the read/write head for causing writing of the altered stored data onto the record. A vend enable circuit is responsive to the compare signal and to the altering circuit and said encoding circuit for enabling the vending of said selected item only after the altering and writing of the stored data. A control circuit controls the sequence of operation of the control system in the foregoing sequence.

25 Claims, 33 Drawing Figures

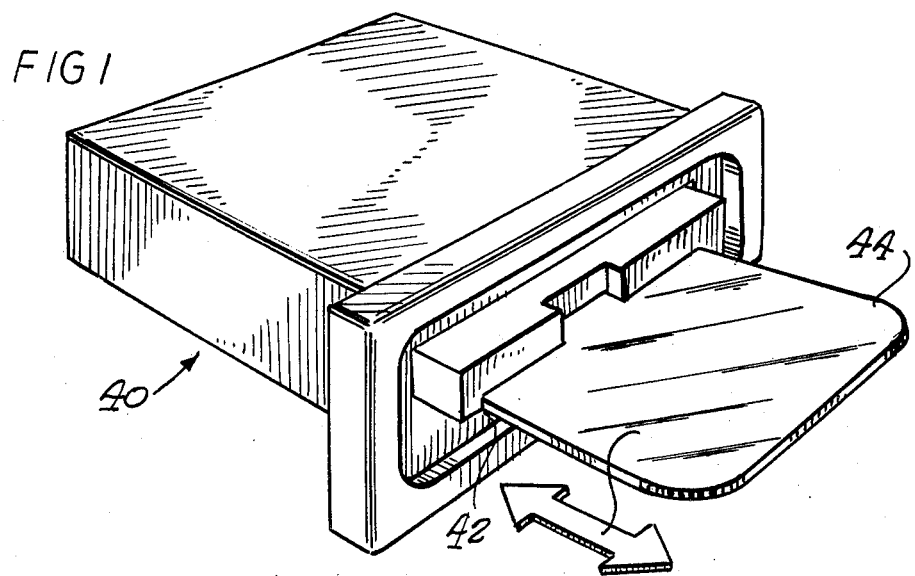
FIG 1
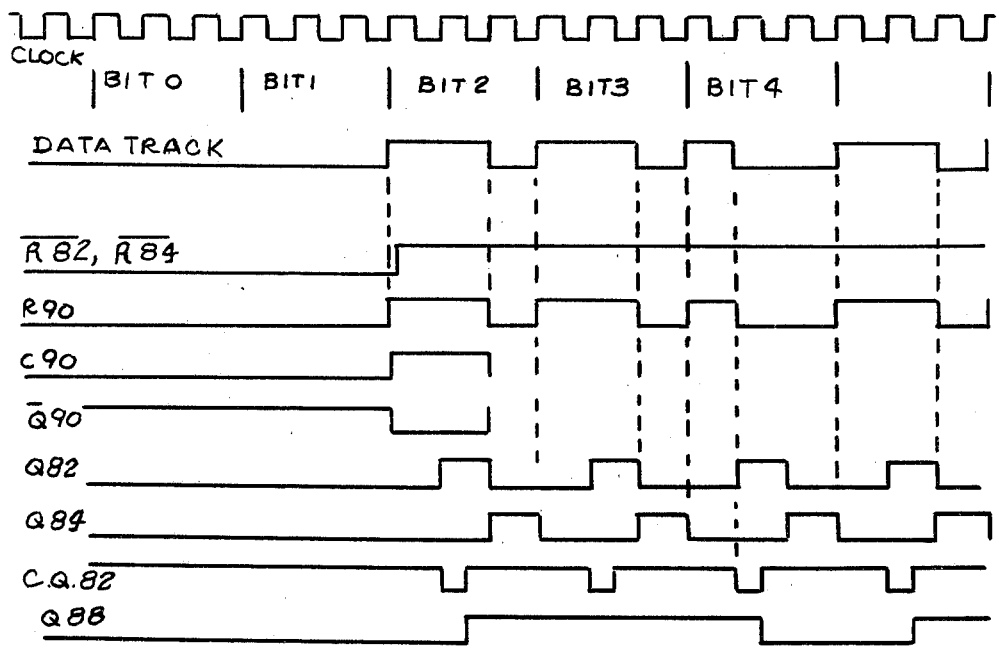
FIG 2
1 1 1 1 1 1 1 1 1 0 0 1/0 1/0 1/0 1/0 1/0 1/0 1/0 1/0 1/0 1/0 1/0 1/0
TEN CREDITS — BLANK ZERO — OPERATOR CODE
FIG 4

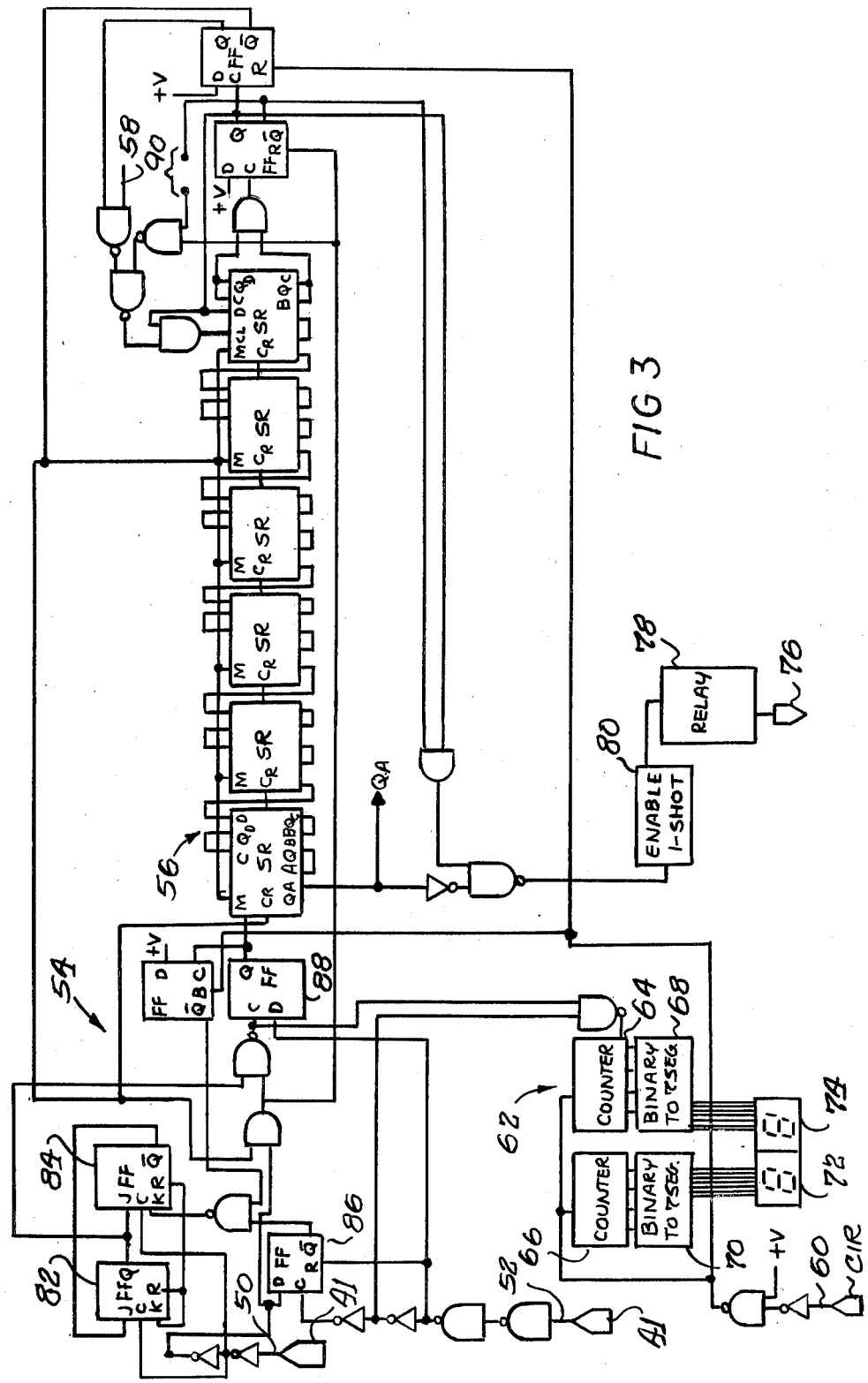

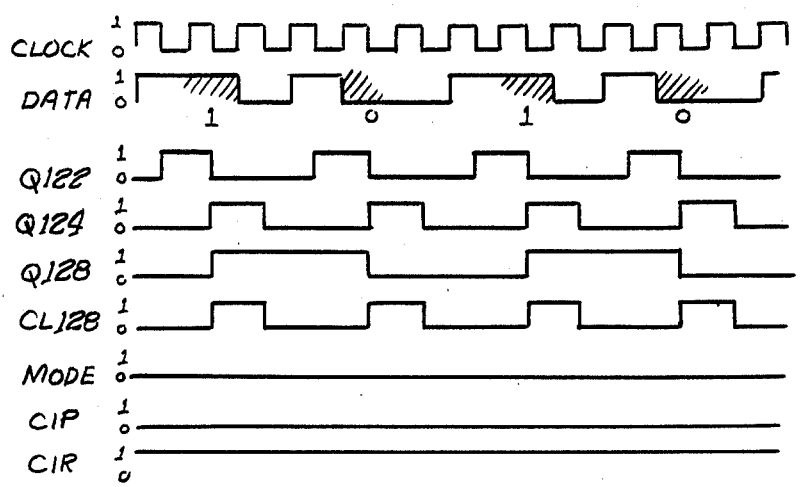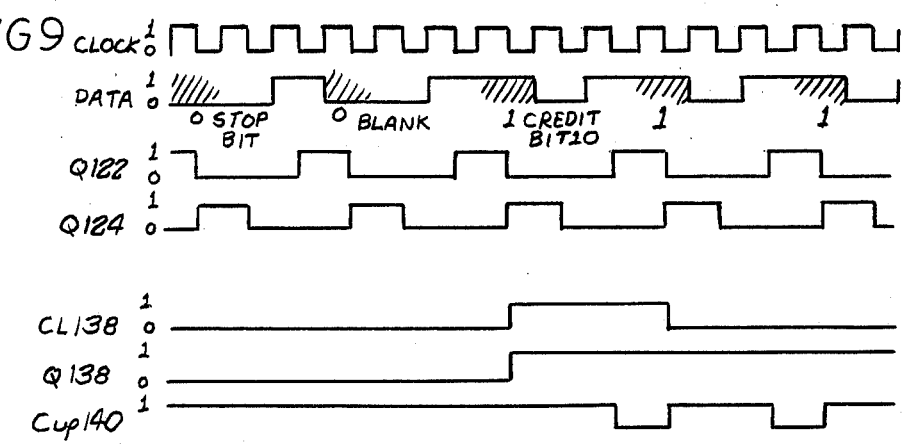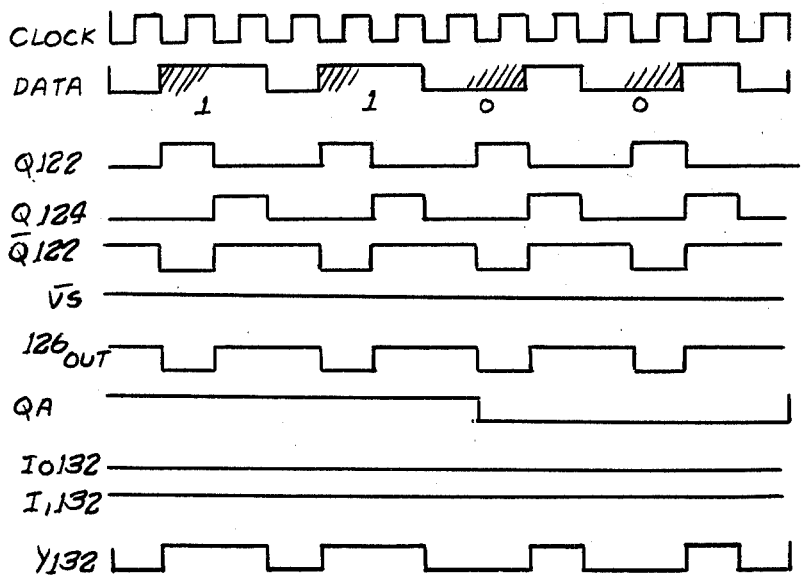

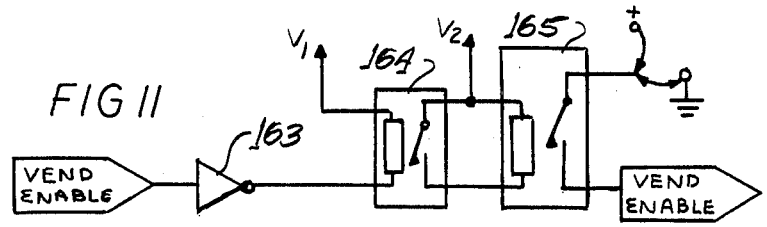
FIG 11
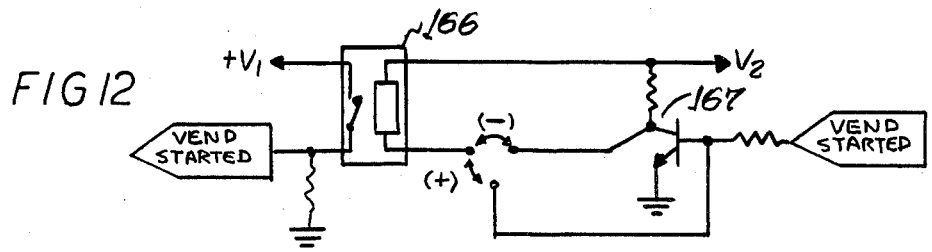
FIG 12
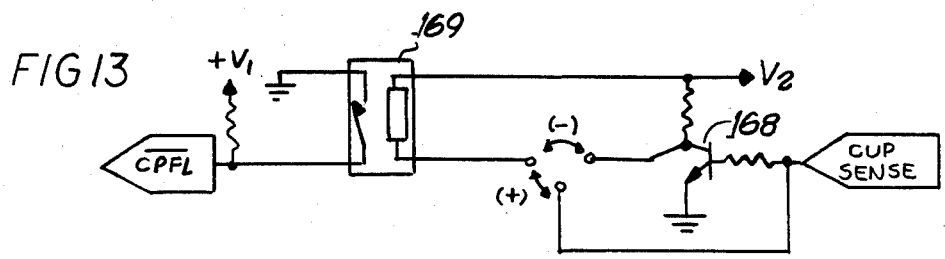
FIG 13
FIG 14
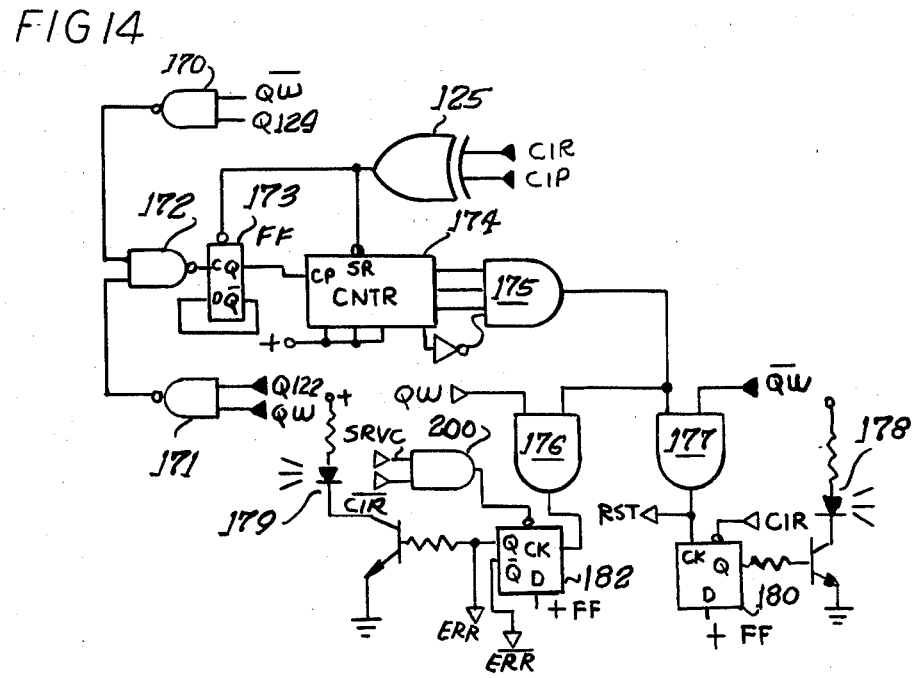

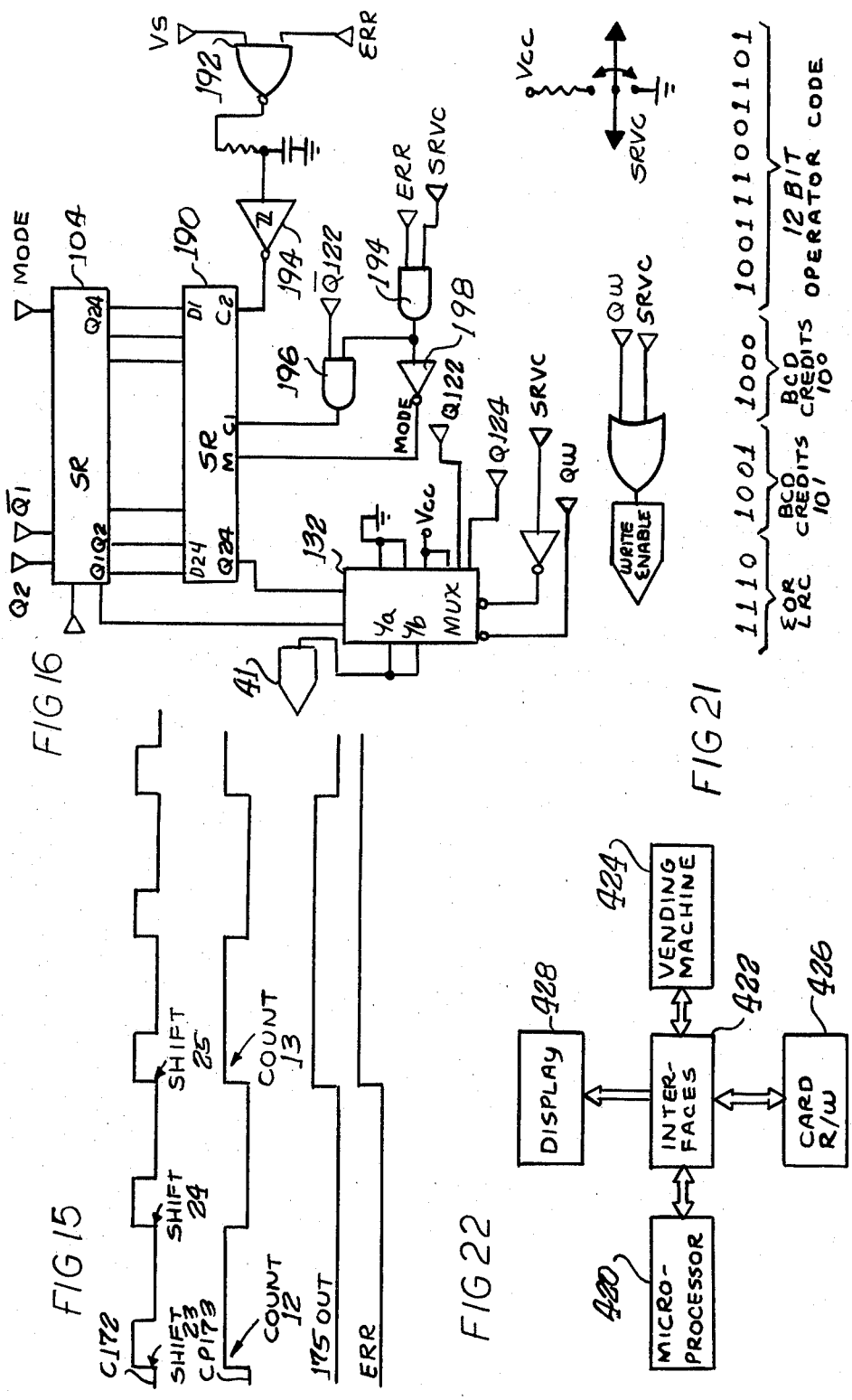

RECORD OPERATED CONTROL SYSTEM FOR A VENDING MACHINE

BACKGROUND OF THE INVENTION

This invention relates generally to record operated control systems and more particularly to a card-operated control system for a vending machine.

It will be understood in the following descriptions that references to "card" or to "card"-responsive apparatus is to be taken as equally applicable to any record-carrying medium. Moreover, while the present discussion will be facilitated by reference to a vending machine, it will be understood that other like-operated systems are also intended to be embraced by this term. Additionally, the term "vending machine" is to be taken to refer not only to machines which dispense food or drink items, cigarettes, etc., in response to deposit of sufficient money or monetary substitutes, but also to such similar mechanisms as a transit ticket dispensing system, a "coin-operated" phonograph or "jukebox" and other like apparatus.

Vending apparatus of the types discussed above are generally well-known. However, in most vending apparatus, the operation is generally limited to a single operation or dispensing of an article for a single deposit of sufficient coins or other monetary substitutes, such as tokens, etc., whereupon the operating cycle is complete. That is to say, systems heretofore known have generally not been adapted to performing a number of separate vending or article dispensing operations in response to a single deposit of money or money substitute providing sufficient credit for a plurality of such operations.

Further in this regard, vending and like apparatus heretofore known have generally not been adapted for operation with a credit card type of credit medium. In the system of the present invention, such a card can be readily presented to the machine, verified, and used to provide the credit necessary for the number of vending operations or articles desired to be dispensed. Moreover, such vending machines have not heretofore been usable with a credit card type of medium bearing a preselected credit amount thereon, whereby the amount of credit necessary for the desired purchase or vending operation may be cancelled from the card before the completion of the vending operation or purchase.

One problem encountered in providing a credit card type credit medium for vending purposes is that of preventing fraudulent use thereof. For example, it is important that the credit card medium carry sufficient data, and that the vending machine be capable of recognizing such data, to verify that the card is valid for the purchase desired. Further in this regard, such a system must be capable of cancelling the appropriate amount of credit from the card before completing the vending operation, so that the card may not be removed prior to completion to avoid the proper credit cancellation and thereby defraud the system. While various locking devices may be utilized to prevent removal of the card prior to the completion of the vending operation, such devices add expense and complexity to the system. Moreover, such locking devices generally require removal and re-insertion of the credit card medium for each vend operation desired, and hence do not permit the convenience of continued selection and vending operations for so long as the card remains inserted and sufficient credit remains available on the card.

Since many types of vending and like machines are currently in operation in the field, it would also be desirable to provide a card operated control unit which is readily adaptable for use with any of these vending machines, without requiring substantial modification thereto.

OBJECTS AND SUMMARY OF THE INVENTION

Accordingly, it is an object of the present invention to provide a novel and improved record operated control system for a vending machine.

A more specific object is to provide a system of the foregoing type which is adapted for controlling a vending machine in accordance with both credit information and validation information.

Another object is to provide a system of the foregoing type which is readily adaptable for use with any of a broad variety of vending apparatus and with a commercially available card reader/writer mechanism, without requiring substantial modification to either the vending apparatus or the reader/writer mechanism.

A further object is to provide a system of the foregoing type which will permit a plurality of vending operations upon a single insertion of a credit card bearing sufficient credit into a card reader/writer mechanism.

A still further object is to provide a system of the foregoing type which is capable of substantially preventing errors during the reading and writing operations.

Briefly, and in accordance with the foregoing objects, a record operated control system for a vending machine including a record reading/writing apparatus having read/write head means for reading and writing data on a record during relative movement between said record and said read/write head means, comprises: decoding means coupled with said read/write head means for decoding data read from said record thereby, data storage means coupled with said decoding means for receiving and storing said decoded data, comparing means for comparing at least a portion of said stored data to predetermined data and for producing a compare signal if said data compare, data altering means responsive to said compare signal for altering the stored data in accordance with the amount of credit required to vend a selected item, encoding means coupled with said storage means and with said read/write head means for causing writing of said altered stored data onto said record, vend enable means responsive to said compare signal and to said altering means and said encoding means for enabling the vending of said selected item only after said altering and said writing of said stored data.

BRIEF DESCRIPTION OF THE DRAWINGS

The foregoing, as well as other objects, features and advantages of the present invention will be more readily appreciated upon consideration of the following detailed description of the illustrated embodiments, together with the accompanying drawings, wherein:

FIG. 1 is a perspective view of an exemplary, commercially available card reader/writer mechanism;

FIG. 2 illustrates one form of card encoding in accordance with the present invention;

FIG. 3 is a circuit diagram of a first embodiment of a portion of a control system according to the invention;

FIG. 4 is a waveform or timing diagram illustrating the operation of the circuit of FIG. 3;

FIGS. 8, 9 and 10, are waveform or timing diagrams illustrating features of the operation of the circuits of FIGS. 5, 6 and 7;

FIGS. 11, 12 and 13 are circuit schematic diagrams of interfacing arrangements between the circuits of FIGS. 5, 6 and 7 and the mechanisms of a typical vending machine;

FIG. 14 is a circuit schematic diagram of an error detection feature which may advantageously be used with the circuits of FIGS. 5, 6 and 7 in a preferred form of the invention;

FIG. 15 is a waveform or timing diagram illustrating features of the operation of the circuit of FIG. 14;

FIG. 16 is a circuit schematic of a storage circuit which may be used with the circuit of FIGS. 5, 6 and 7 and with the circuit of FIG. 14 in a preferred form of the invention;

FIG. 21 is an illustration of the form of data carried on a credit-type card with which the system illustrated in FIGS. 17 through 20, inclusive, is intended to operate;

FIG. 22 is a block diagram of a microprocessor-based embodiment of the system of FIG. 17;

FIG. 31 is a circuit schematic diagram illustrating a circuit for a modified form of operation of the circuits of FIGS. 18A, 18B, 19 and 20;

FIG. 32 is a waveform or timing diagram illustrating features of the operation of the circuit of FIG. 31; and FIG. 33 is a circuit schematic of a further feature which may be added to the embodiment of FIGS. 18A, 18B, 19 and 20.

DETAILED DESCRIPTION OF THE ILLUSTRATED EMBODIMENT

Figure 5:
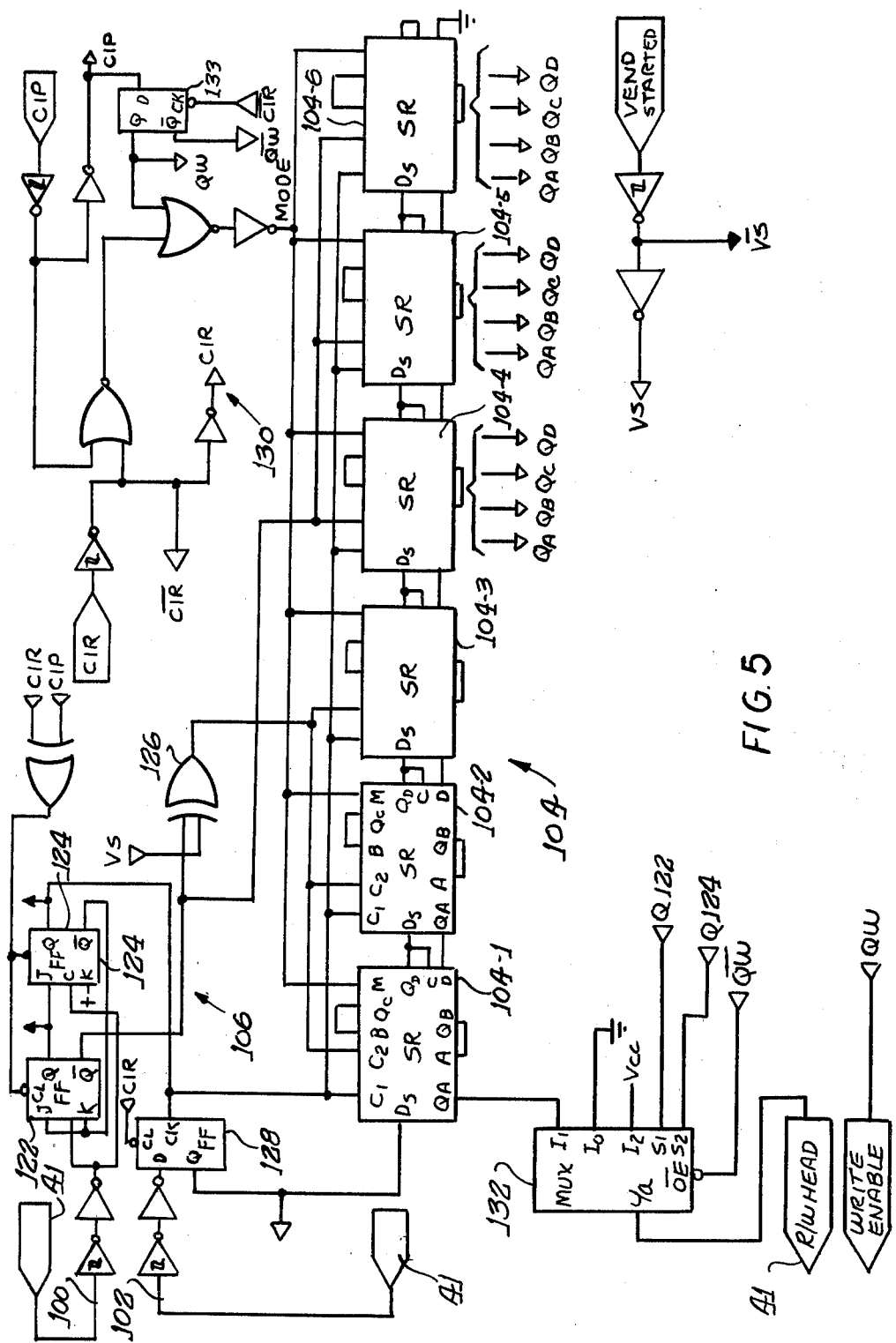
FIGS. 5 and 6 taken together form a schematic circuit diagram of a second embodiment of the portion of a control system according to the invention shown in FIG. 3.

Referring now to the drawings and initially to FIG. 1, a card reader unit is designated generally by the reference numeral 40. This card reader unit includes a read/write head 41 (FIG. 3) of conventional construction and includes a slot 42 for receiving a record in the form of a card 44. In accordance with a preferred form of the invention, this card 44 is similar to a conventional credit card, and bears one or more strips of magnetizable material thereon for carrying encoded information. The card reader unit 40 may be of a commercially available type such as a series 2005 badge reader, available from Amtron Systems, St. Louis, Mo., or alternatively, a Vertel Model KB31, available from Vertel, Inc., Clifton, N.J.

The former type of card reader includes a stationary read/write head 41 for reading or writing one or more tracks of data carried on the card 44. Moreover, the card 44 is moved relative to the stationary read/write head 41 manually, that is, by manual insertion and withdrawal of the card relative to the slot 42 of the card reader 40. In contrast, the latter type of card reader 40 utilizes a motorized, moving head 41 whereby the user merely inserts the card 44 fully into the card reader 40 through slot 42, whereupon the head drive motor may be actuated to move the read/write head relative to the card 44.

Advantageously, the embodiments of the control system hereinafter described are adapted for operation with one of these two types of card reader 40. The control system of the invention advantageously controls the operation of a vending or like machine in accordance with the data or information carried on a card 44, as read by the card reader 40. Moreover, the control system of the invention is capable of controlling the write function of the card reader 44 for writing new or altered information onto the card 44 upon each operation of the vending machine, for example, to decrease the amount of credit available on the card 44 upon the vending of an item requiring a given amount of credit.

In accordance with one embodiment of the invention, the credit data carried upon the card 44 is in binary form, and arranged generally as illustrated in FIG. 2. Reading from left to right, the first ten binary digits of data correspond to unit credits, a 1 indicating a credit unit and a 0 indicating the absence of a credit unit. While the invention may operate with as many as 350 credit units, the present description is simplified by reference in the illustrated embodiment to but 10 of these credit units.

Following the initial credit data, two control bits or digits are carried on the card 44. These control bits are followed by 12 bits or digits of binary operator or validation code. This latter validation code, as will be seen later, is pre-encoded on the card 44, for purposes of comparison with a like validation code preset into the circuits of the invention for use with a given vending machine, to ensure that the card 44 is usable only in vending machines compatible therewith.

Further in this regard, in the illustrated embodiments, the control system of the invention is configured for operation in terms of credit units which may each be of any given value, for example, one cent, five cents, ten cents, etc. Since the present invention is intended for application to existing vending machines without requiring modifications thereto, the illustrated embodiments all comprise unit price systems. That is, they are intended for use with vending machines in which all articles vended are the same price. It will be understood, however, that the system is readily usable with vending machines which dispense articles of differing prices, but such use requires additional modification of the vending machine itself and the provision of suitable intervening pricing circuitry between the vending machine and the system of the invention. Such modifications and intervening circuitry are beyond the scope of the present disclosure.

Referring now to FIG. 3, a circuit schematic diagram of a first embodiment of control system according to the present invention is intended for use with a card 44 bearing two tracks of information. The first of these tracks comprises the data in the form as generally indicated in FIG. 2, while the second track bears a train of clock signals of a given constant frequency and duty cycle for purposes of timing and synchronizing the operation of the system. Moreover, the circuit of FIG. 2 is especially adapted for use with the first type of card reader 40 mentioned hereinabove, that is, a card reader wherein the user manually moves a card 44 past a stationary read/write head 41.

Accordingly, the clock information is received at a first input terminal 50 while the data is received at a second input terminal 52. The data at terminal 52 is properly synchronized by the clock signals and decoded by circuitry designated generally by the reference numeral 54 and fed to a storage device comprising a serial-in/serial-out shift register designated generally by the reference numeral 56.

In order to write data from the shift register 56 back onto the card 44, for example, at the end of a transaction, a suitable write clock signal is also received at input terminal 58. This write clock is taken from the read clock carried on the card, to properly time or synchronize the writing of data back onto the card 44. Additionally, the card reader unit 40 includes a suitable sensor for producing a card in reader signal (CIR) when the card is inserted into the slot 44. This signal is input to the circuit of FIG. 3 at an input terminal 60.

The data stream fed to the shift registers 56 is also fed to a display circuit 62 comprising a pair of decade counters 64, 66 which feed a pair of decade-to-seven-segment decoders 68 and 70. The display comprises a pair of seven-segment display elements 72, 74 fed from these decoders 68, 70. The display circuit 62 is fed from selected points in the input circuit 54 so that only the credit information carried on the card 44 is displayed when the card is read upon insertion thereof into the card reader 40.

A vend enable output signal at an output terminal 76 is derived from a suitable actuator such as a relay 78, driven from a one-shot 80. This one-shot 80 is in turn energized from suitable points in the circuit of FIG. 3 to enable the vending of an item when the card has been validated, the existence of sufficient credit verified, and the required amount of credit cancelled therefrom. Advantageously, this mode of operation ensures that an item will not be vended unless and until the proper amount of credit has been cancelled from the card 44, thus preventing the vending of an item "free of charge", for example, should the card 44 be withdrawn prior to completion of the vend cycle.

Referring now to the input circuit 54, a divide-by-three circuit is provided by a pair of flip-flops 82, 84 connected to form a divide-by-three circuit. In the illustrated embodiment, the clock signals and data signals are arranged such that three periods of clock signals are produced per unit of data. The data track is encoded on the card to have a positive transition at the first positive transition of the clock signal per unit time (i.e., three periods) and a negative transition at one of the next positive transitions of the clock signal or at the last positive transition of the clock signal in the same time unit (i.e., three clock periods).

Referring briefly to FIG. 4, the clock signals are illustrated in the foregoing form, that is, three periods of clock per unit time. Similarly, the data track, illustrated directly therebelow, includes a positive transition at the first positive going clock pulse in each of these units of time. However, the data track does not start until after at least two units of clock signals. These first two units of clock signal are utilized for start-up control purposes. As mentioned above, each data pulse then has a negative transition either at the next positive clock transition of its associated time unit or at the last positive clock transition of this time unit. The first two bits of data are arranged to form a start character for this system which are decoded and used to trip a pulse circuit including a flip-flop 86 (FIG. 3). This flip-flop 86 in turn trips a second flip-flop 88 which controls a mode control input to the shift register circuit 56 in order to change from right shift mode to left shift mode. Additionally, the first flip-flop 86 causes the addition of a 1 in the right-most bit of the shift register 56 upon the first left shift thereof. This will correspondingly remove the bit stored in the left-most bit of the shift register 56.

In the illustrated embodiment, the shift register 56 comprises six, serially connected four-bit shift register elements of the type generally designated 7495. Accordingly, storage is provided for the 24 bits of data or information carried on the card in the illustrated embodiment, as described above with reference to FIG. 2. The embodiment of FIG. 3 is arranged to recognize credits in inverse logic form, that is, a logic 0 carried on the credit portion of the data word of FIG. 2 represents a credit while a logic 1 represents absence of a credit. When the flip-flop 88 produces the mode control pulse mentioned above, if a logic 0 or credit is stored in the left-most bit of the shift register 56, the one-shot 80 is enabled to cause the vend enable signal.

Additionally, a verify input terminal 90 is provided for connection to a suitable external control switch. If the user merely wishes to verify or display the number of credits available on his card, without actually purchasing an item, switching the terminal 90 to ground will permit reading of the credit data only on the display characters 72, 74. Grounding of this terminal 90 will not allow the cancelling of credit by the shift register 56 nor the enabling of a vend by way of the one-shot 80.

Referring again to FIG. 4, the system timing is illustrated below the clock signal and data track signal as described above. Briefly, the signal at the reset terminals of the flip-flops 82, 84 is labeled R82, R84. Similarly, the signals at the reset terminal and clock terminals of the flip-flop 90 are labeled R90 and C90, while the output at the $\overline{Q}$ terminal thereof is labeled Q90.

In similar fashion the resultant output signals at the Q terminals of the respective flip-flops 82, 84 and 88 are labeled respectively Q82, Q84 and Q88 while the line labeled C, Q82 illustrates the resultant signal at the clock and Q terminals of the flip-flop 82.

Figure 7:
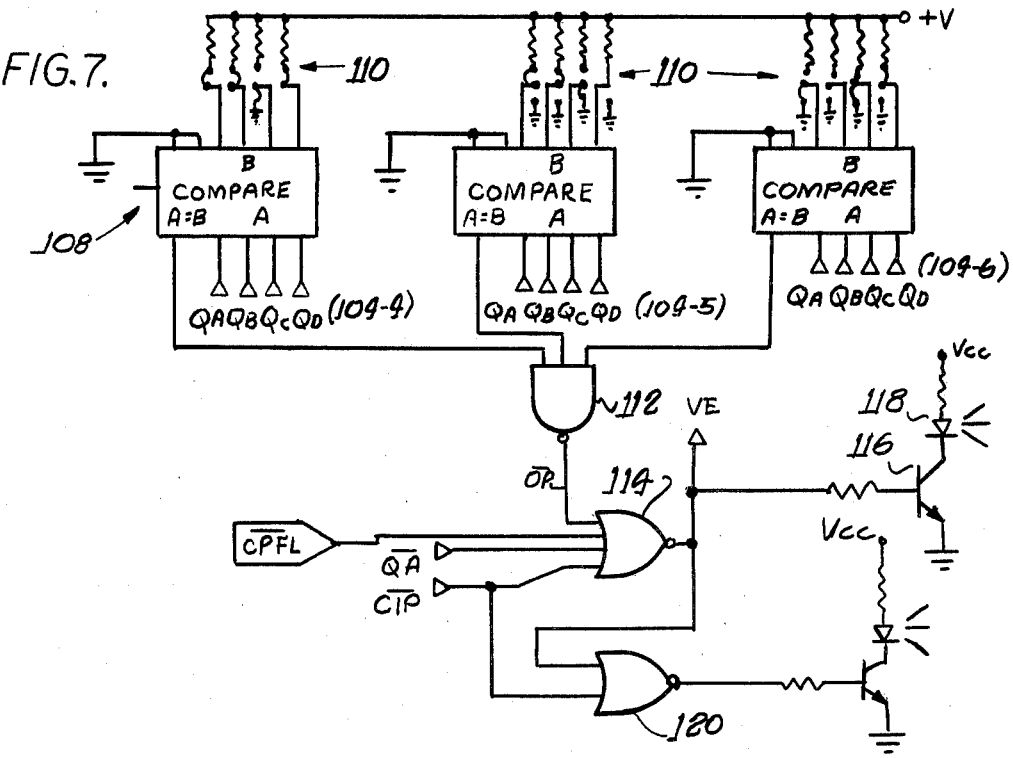
FIG. 7 is a schematic circuit diagram of a remaining portion of a control system usable with either of the embodiments of FIG. 3 or of FIGS. 5 and 6.
Figure 6:
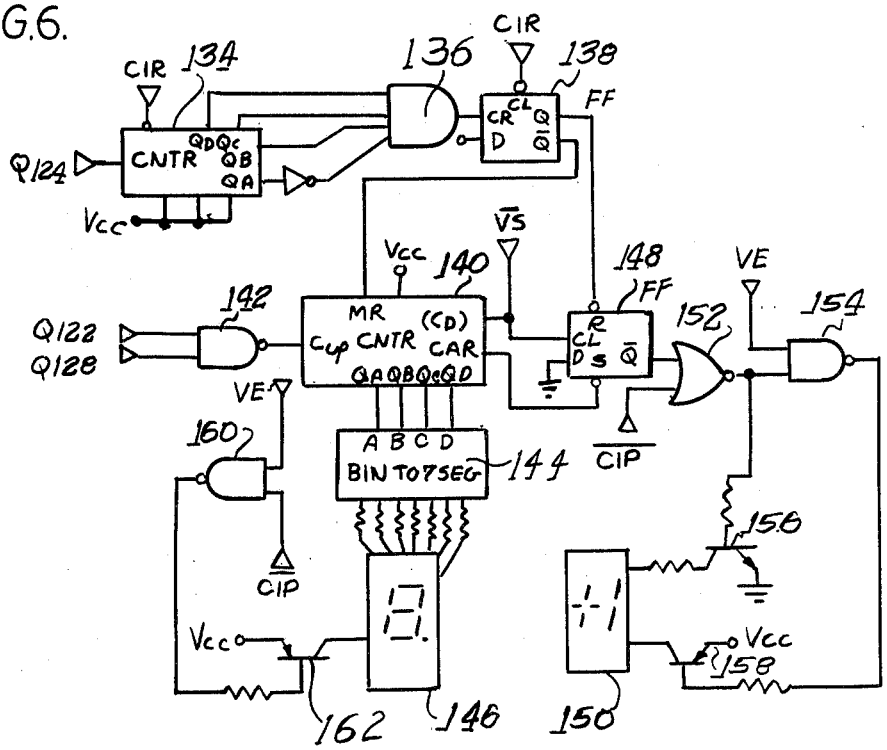

Referring now to FIGS. 5 and 6 a second embodiment of the circuit of FIG. 3 is illustrated. This circuit is also suitable for use with the card reader 40 of the type described, wherein a stationary head reads two tracks recorded on the card 44, containing respectively clock signals and data signals. FIG. 7 shows a comparator circuit for checking the 12-bit validation code on the card, and is usable with either of the circuits of FIG. 3 or of FIGS. 5 and 6.

Referring initially to FIG. 5, the clock signals and data signals from the read/write head of the card reader 40 are fed to respective input terminals 100, 102 of the circuit. In similar fashion to the circuit of FIG. 3, the data is decoded in accordance with the clock signals and fed in serial fashion to a 24-stage shift register 104, which is comprised of six, 4-stage shift registers, 104-1 through 104-6, inclusive, of the type generally designated 7495. The shift registers 104 are connected in serial-in/serial-out fashion. The serial data word carried on the card is in the same form as that illustrated and described hereinabove with reference to FIG. 2. Accordingly, the first 12 bits of the data comprise an operator or validation code which at the end of 24 shifts, which are clocked through by the clock 100 by way of the input decoding circuitry 106, are stored in the right-hand three shift registers 104-4, 104-5 and 104-6.

Referring now to FIG. 7, a comparator circuit is shown. In this circuit, the 12 bits of validation data are compared with a preset 12-bit validation code by a group of three, 4-bit comparators designated generally by the reference numeral 108. Each of these comparators 108 is provided with a set of four terminals at one set of compared inputs which may alternatively be jumpered either to ground or to a suitable positive voltage supply to form a 12-bit validation code for a given vending machine or a type of vending machine. The other set of compared inputs of these comparators is wired in parallel with the bits of the shift registers 56 or 104 which carry the validation code read from the card 44. In the case of the shift registers 104 of FIG. 5, this data is present at shift registers 104-4, 104-5 and 104-6. In the illustrated embodiment, the comparators 108 are of the type generally designated 7485.

The compare outputs of these three comparators 108 are fed to the inputs of a three-input NAND gate 112 whose output forms a first portion $\overline{OP}$ of a vend enabling signal. This output of the NAND gate 112 together with remaining enabling signals, explained hereinbelow, form respective inputs to a four-input NOR circuit 114 whose output comprises the vend enable signal (VE). This vend enable signal may drive a suitable switching element such as a transistor 116 for energizing a suitable indicator lamp such as an LED 118 which instructs the user to proceed to make a selection of an item to be vended. The vend enable signal also feeds a further two-input NOR gate 120 which lights a similar lamp, when the VE signal is not produced, for example, should the validation codes of the card and the circuit not agree, indicating to the user that an invalid card is being inserted in the machine. Other inputs to the NOR gate 114 include a card in position (CIP) signal which is derived from a sensor in the card reader 40 when the card 44 is fully inserted therein, and the first state signal from the shift register 104, here designated as $\overline{Q_A}$, which indicates that at least one credit is present on the card, in the left-hand most bit thereof, stored in the shift register 104. An additional enabling signal CPFL may also be added and is derived from a vending machine sensor which outputs a suitable signal if articles to be vended are present, i.e., the machine is not empty. The CIP signal is also fed to the remaining input of the NOR gate 120.

Advantageously, the foregoing circuits assure both that a valid card has been inserted and that at least one credit remains on the card for the purchase of an item before enabling the vending cycle, and more particularly before indicating to the user that selection of an item may be initiated. However, and referring again to FIG. 5, before the actual vending may occur, cancellation of a corresponding credit from the shift register 104 and the writing of the altered credit data back onto the card 44 must take place.

In similar fashion to the circuit of FIG. 3, the input logic 106 includes a pair of flip-flops 122, 124 wired as a divide-by-three circuit, the output thereof feeding an exclusive-OR gate 126. The remaining input of this exclusive-OR gate 126 receives vend started signal (VS) derived from the vending machine when the actual vending of an item begins to take place.

A D-type flip-flop 128 receives the data from the read/write head 41 and cooperates with the divide-by-three circuit comprising flip-flops 122 and 124 in clocking the data into the shift register 104 in serial fashion. As in the embodiment of FIG. 3, and referring briefly to the timing diagram of FIG. 8, one bit of data is stored for every three periods of the clock signal carried on the card 44. In this regard, the portion of the data track occurring during the second period of each three-period clock interval is the data to be stored by the shift registers 104, hence if the data signal is at a logic 1 or high state at that time a logic 1 is fed to the shift registers 104, whereas if the data track signal is at a logic 0 or low state a corresponding logic 0 is fed to the shift registers 104 at that data position.

During the reading process, the mode control line to the shift registers 104 is in a low or logic 0 state so that the shift registers will continue to shift right to serially receive the data input thereto from the decoding circuit 106. This mode control is achieved by a logic circuit designated generally by the reference numeral 130 which receives a card in reader (CIR) signal when the card 44 is initially inserted into the reader 40, and a card 44 in position (CIP) signal when the card 44 is fully inserted into the reader 40. This latter CIP signal is the same as mentioned above with reference to FIG. 6. When the card 44 is fully inserted into the reader 40, the entire length of the data track thereon will have been scanned and read by the head, and accordingly the CIP signal will go high and the mode signal will change from logic 0 to logic 1 such that the shift registers 104-1, 104-2 and 104-3, which store the credit data, will be changed to the shift left mode, waiting a further clocking signal to shift left for credit cancellation purposes in the same fashion described above with reference to FIG. 3.

As soon as the vend enable signal has been given as described above with reference to FIG. 7, the credits data only, that is the data in the left-hand three shift registers 104-1, 104-2 and 104-3, is shifted left by the falling edge of the vend start (VS) pulse, fed thereto by way of the exclusive-OR gate 126. Accordingly, the left-most bit of credit data is effectively ejected from the shift register 104-1 and a "no credit" datum or bit is added to the right-hand most bit of the credit data. In the circuit of FIG. 5 this "cancelled" data bit is that appearing prior to the left shift at $Q_A$ of the left-hand most shift register 104-1 while the right-most bit added after the left shift is inserted to the $Q_D$ bit of the third from left shift register 104-3.

Reference is next invited to FIG. 6 wherein a suitable counter and display circuit is illustrated for use with the circuits of FIGS. 5 and 7. Briefly, this display circuit may be utilized to display the remaining credits on the card 44 at the beginning of each vend cycle, or alternatively both at the beginning and the end of each vend cycle to show the credits available both before vending and after vending, when one credit has been deducted. The only difference in the circuit for achieving these two types of display is the type of counter component utilized therein, whereby the circuit is illustrated herein but once.

The display circuit includes a first counter 134 of the type generally designated 74163, which is a synchronous 4-bit binary counter. This counter is clocked by the Q output of the flip-flop 124 and initialized by the card in reader (CIR) signal from the circuit 130. The four output bits of the counter 134 feed the respective inputs of a four-input AND gate 136 whose output feeds the clock input of a D-type flip-flop 138. The clear input of this flip-flop 138 is also fed by the CIR signal, and the $\overline{Q}$ output thereof feeds the MR input of a second counter 140 which functions as the credit counter.

As mentioned above, the counter 140 is of the type designated 7490 if it is desired to display credit only upon card insertion. However, this same counter 140 may also be of the type designated 74192 (which is an up/down counter) if it is desired to display credit remaining after vending (and credit cancellation) as well.

The provision of the first counter 134 in the data stream allows the 12 bits of data corresponding to the validation code and the two control bits to pass through before enabling the counter 140 for counting the credit bits which follow immediately thereafter. The Q outputs of flip-flops 122 and 128 respectively feed a two-input NAND gate 142 whose output feeds the count input of the counter 140. In the case where an up/down counter is utilized this NAND gate 142 feeds the count up terminal, while the vend started signal (VS) in inverted form, as derived in the circuit of FIG. 5, feeds the count down terminal thereof. This $\overline{VS}$ signal is not used by the counter 140 when the type 7490 counter is utilized.

Referring briefly to FIG. 8, the relative timing of the various pulse signals in the data reading operation is illustrated. The clock and data tracks have already been discussed. The remaining signal trains represent the $Q_1$ output of flip-flops 122 and 124, the Q output and clock input, respectively, of the flip-flop 128, the mode signal at the output of the circuit 130 and the card in position and card in reader signals (CIP and CIR) produced by this circuit 130. Read/write control signals to the read/write head 41 of the card reader 40 are also derived from the signals developed in the circuit of FIG. 5, by way of a decoder 132 which receives the Q signals from the flip-flops 122 and 124 as indicated and a QW or write control signal developed by a D flip-flop 133 in the circuit 130. This QW signal is also fed directly to the read/write head 41 as a write enable signal. In the illustrated embodiment, the decoder 132 is of the type generally designated 74LS253 Tri-State Data Selector/Multiplexer.

The 4-bit output of the counter 140 feeds a 4-bit binary to seven-segment decoder circuit 144 (FIG. 7) which in turn drives a suitable seven-segment display character 146 (e.g. TIL312). To display in excess of nine credits the counter is connected to a further flip-flop 148 to drive a tens character of the display which comprises a second display unit 150. This flip-flop 148 has its clock input fed by the $\overline{VS}$ signal. The flip-flop 148 is a set-reset flip-flop and has its reset terminal driven from the Q output of the flip-flop 138 and its set input fed from the carry output of the counter 140. The $\overline{Q}$ output of the flip-flop 148 feeds one input of a two-input NOR gate 152 whose other input is fed from the $\overline{CIP}$ signal produced by the circuit 130 of FIG. 5. The NOR gate 152 feeds one input of the display unit 150 by way of a suitable drive transistor 156 while a NAND gate 154 fed from the vend enable (VE) signal and from the output of the NOR gate 152 drives the other input terminal of the display unit 150 by way of a transistor driver 158. The display unit 150 is of the type generally designated TIL327 and is wired in the present embodiment for displaying only a one character, when energized by the foregoing circuitry. Hence the display unit 150 provides the tens display while the display unit 146 provides the units display of the credit available on the card 44. Additionally, the display unit 146 is energized or enabled by the $\overline{VE}$ and $\overline{CIP}$ signals by way of a suitable NAND gate 160 and driver transistor 162.

Referring briefly to FIG. 9, the credit counter timing waveforms are illustrated. The clock and data pulse trains carried on the credit card as received at the inputs 100, 102 of the circuit of FIG. 5 are first illustrated. Therebelow, the output waveforms of the Q output of flip-flops 122 and 124 are illustrated. Also illustrated are the waveforms at the clock input of the flip-flop 138 and at the Q output thereof. The final waveform is that at the count or count up input of the counter 140. Also shown are the MODE and CIP signals which are at logic 0 during counting, and the CIR signal, which is at logic 1 during counting.

Referring briefly to FIG. 10, the waveform timing during writing of altered information back onto the card 44 is illustrated. During the write mode, the clock signals on the clock track of the card 44 are again used for timing or synchronization purposes, but since the card is now being withdrawn from rather than inserted into the card reader 40, this clock signal train is essentially "backwards". The desired data is serially left-shifted out from the shift registers 140 to the decoder 132, from which it is clocked by the clock signals as decoded by the flip-flops 122 and 124 back to the read/write head 41 for writing on the card 44.

Reference is next invited to FIG. 11, FIG. 12 and FIG. 13 wherein suitable interface components between the circuits of the invention and a typical vending machine are illustrated. Briefly, each of these circuits utilizes suitable level conversion components such as transistors and relays to convert machine signals into signals at a level usable by the circuit of FIGS. 5 through 7 and vice versa.

In FIG. 11, the vend enable (VE) signal from the circuit of FIG. 6 is fed by way of an inverter buffer 163 to a first relay 164 which in turn energizes a second relay 165 to provide a suitable DC voltage level for actuating the vend mechanism of a vending machine. In the illustrated embodiment, the relay 164 is of the type designated 64-1 and the relay 165 is of the type designated 675-5 both available from Teledyne.

In FIG. 12, the vend started signal from the vending machine is fed through a suitable transistor switch 167 or directly, in the case when the vend started signal is of the opposite polarity, to a relay 166. This relay 166 switches a positive five volts signal usable by the circuits of FIGS. 5 through 7 and designated in FIG. 5 as the vend started (VS) signal. In the illustrated embodiment, the relay 167 is a Teledyne 675-5 type relay.

Referring to FIG. 13 a machine control signal designated CPFL and referred to above with reference to FIG. 6, is derived from a point in the vending machine which indicates that items to be vended are present. For example, in many vending machines the vending items are carried in a structure known as a "cup", which is provided with a suitable detector for determining whether the cups are filled or empty. Accordingly, this cup detector signal is fed through a suitable transistor switching device 168 or directly to a relay 169 (e.g. Teledyne 675-5), depending upon the polarity of the signal, in the same fashion as in FIG. 12. Similarly, this relay 169 switches a suitable five volt level to form the CPFL signal referred to in FIG. 6.

Referring now to FIG. 14, an additional read/write error detection circuit may be utilized in a preferred form of the invention. This circuit receives the output signals from the flip-flops 122, 124 and 134 of FIG. 5 and also the card in reader and card in position signals (CIR, CIP) from the circuit 130 of FIG. 5. Specifically, a first NAND gate 170 receives the $\overline{QW}$ output of the flip-flop 133 and the Q output of the flip-flop 124, while a similar NAND gate 171 receives the Q output of the flip-flop 122 and the QW output of the flip-flop 133. The outputs of these two NAND gate 170 and 171 feed the inputs of a further two-input NAND gate 172 whose output feeds the clock input of a D-type flip-flop 173. The Q output of the flip-flop 173 feeds the count terminal of a 4-bit binary counter 174, which in the illustrated embodiment is of the type generally designated 74163. The CIR and CIP signals and the exclusive-OR gate 125 of FIG. 5 are repeated in this circuit to illustrate the derivation of the clear signal to the flip-flop 173 and a synchronous clear input (SR) of the counter 174. The four bit outputs of the counter 174 feed a four-input AND gate 175 which in turn feeds a pair of two-input AND gates 176, 177, the other inputs of which are fed respectively from the Q and $\overline{Q}$ terminals of the flip-flop 134. The output of the AND gate 176 actuates a write error indicator 179 while the output of the AND gate 177 actuates a read error indicator 178.

In operation, if the user inadvertently reverses directions of the card before the card is either fully in during the read cycle or fully out during the write cycle the appropriate read error or write error signal will be given.

For example, while inserting or withdrawing the card the user may inadvertently lose hold of the card causing the card to be "wobbled" somewhat on the way in or out of the unit. If this occurs during the read mode, the card will not be properly read and it will be treated as an invalid card. This would merely require that the read error signal be given, so that the card may be removed and re-inserted properly. If the unit is in the write mode when this error occurs, the data written onto the card will be incorrect, thus either rendering the card invalid or resulting in improper amount of credit being returned to the card. In the case of a read error a flip-flop 180 is interposed between the output of the AND gate 177 and the read error indicator 178. The output of the AND gate 177 also comprises a reset signal (RST) for resetting the circuitry of FIGS. 5 through 7, so that the read cycle may be begun again upon removal and re-insertion of the card.

Briefly, the circuit of FIG. 14 utilizes the counter 174 to count 24 shifts in the shift register 104. Should more than 24 shifts occur, it must be due to the card being reversed in direction prior to being fully in or fully out, as described above. The timing diagram of FIG. 15 further illustrates the operation of the circuit of FIG. 14. This diagram illustrates the pulse output of the NAND gate 172 which counts the shifts, from the twenty-third shift thereof including shifts numbers 24 and 25. Accordingly the Q output of the flip-flop 173, which is wired as a divide-by-two, feeds a count 12 and a count 13 to the counter 174. The output of the AND gate 175 thus goes high at the onset of count 13 in the counter 174 thereby causing the error signal to appear at the Q output of flip-flop 182 or at the Q output of flip-flop 180, depending on whether the circuit is in the read mode or write mode.

In the case of a write error the AND gate 176 actuates the error signal 179 by way of a flip-flop 182. Additionally, the Q and $\overline{Q}$ outputs of the flip-flop 182 produce error and inverted error signals (ERR and $\overline{ERR}$) which may be utilized in a storage circuit illustrated in FIG. 16, to which reference is now invited. In the circuit of FIG. 16 the contents of the shift register 104 are fed to a further, similar 24-bit shift register 190 which holds the data until the write cycle has been successfully completed. In this way, should an error occur during the write cycle, the data is preserved so that the write cycle may be restarted with the correct data.

Referring now to FIG. 16, the shift register 104 is again illustrated to facilitate the description. This shift register 104 has its stages wired directly in parallel, but in reverse order, to the 24 stages of the shift register 190. The control signals VS and $\overline{ERR}$ feed one control terminal of the shift register 190 through suitable intervening logic including a NAND gate 192 and Schmitt trigger 194. Further control signals are derived from the ERR signal from FIG. 14 and the $\overline{Q}$ signal from the flip-flop 122 of FIG. 5. These signals, together with a "service" (SRVC) signal feed suitable intervening logic including a pair of AND gates 194, 196 and an inverter buffer 198 to remaining control terminals of the shift register 190. Briefly, the service signal (SRVC) is actuated by a service attendant, by throwing a switch which is inaccessible to the customer. For example, this switch may be behind a locked door or panel such that only a service attendant may actuate the switch, thereby producing the SRVC control signal. The signals from the Q terminals of the flip-flops 122 and 124 together with the SRVC signal and $\overline{QW}$ signal also form inputs to the decoder/demultiplexer circuit 132 of FIG. 5 which has been shown again in FIG. 16 to aid in the description thereof. It will be remembered that this decoder/demultiplexer feeds the read/write head 41 of the card reader unit 40. Accordingly, the shift register 190 is loaded in parallel (but reverse order) from the serially loaded shift register 104 after cancellation of a credit prior to vending, thus separately storing the data to be written back onto the card following a vend transaction. If an error occurs during the card write process, the ERR signal prevents the shift register 190 from being reloaded until a service attendant rectifies the write error. When the attendant has actuated the SRVC switch and the card has been re-inserted into the reader 40, the card may then be withdrawn with the data re-written thereon correctly, whereupon if no further error occurs in the write process, the ERR signal is automatically cleared by the coincidence of the SRVC and $\overline{CIR}$ signals at an AND gate 200 of FIG. 14.

Figure 17:
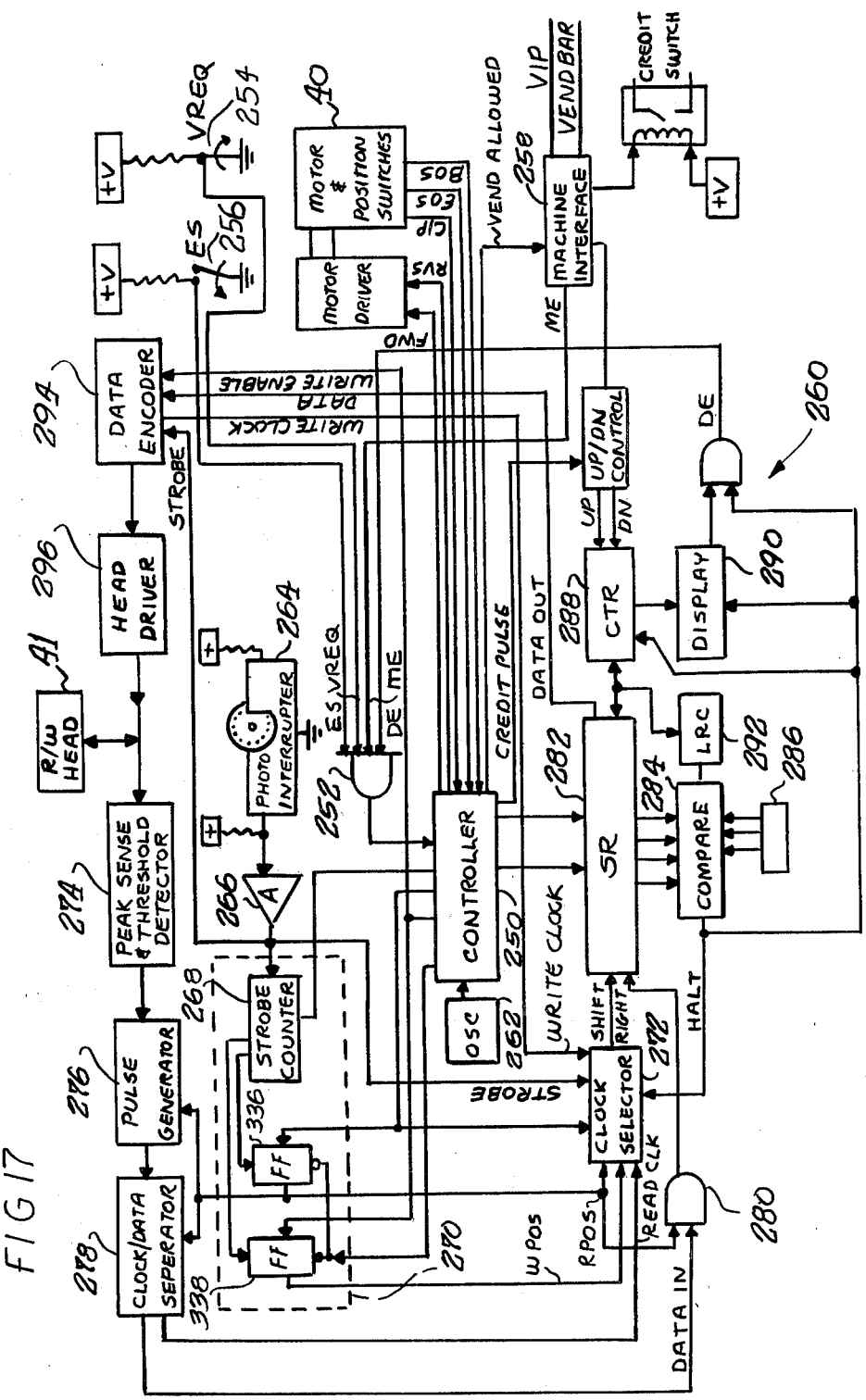
FIG. 17 is a block diagram of a second embodiment of a control circuit in accordance with the present invention.

Reference is next invited to FIG. 17 wherein a second embodiment of the invention is illustrated in block diagrammatic form.

As discussed briefly above, this second embodiment is suitable for use with a type of card reader device 40 wherein both clock and data are encoded onto a single magnetizable strip on the card 44 and wherein the card is fully inserted into the card reader unit 40 and read or written by a movable head. Such a card reader is available, for example from Vertel, Inc., Clifton, N.J., as Vertel Model KB31. While additional decoding and control functions are requred for the operation of this type of card reader, some advantage is obtained in reading but a single track from the card 44 while the card is held stationary, fully inserted into the card reader 40. For example, errors which might occur due to improper insertion or removal of the card by the user are substantially eliminated in this latter type of system.

As in the first embodiment, the credit is cancelled and re-written on the card prior to the enabling of vending of an article, to substantially eliminate fraudulent use of the card. Moreover, in the embodiment illustrated in block form in FIG. 17, an additional vend request control is provided for the user to initiate the vend cycle, whereby the user may merely insert the card for purposes of verifying the amount of credit remaining, without entering the actual vending operation. Additionally, the circuit of FIG. 17 is arranged to follow every write operation immediately with a read operation so that the amount of credit written onto the card following a vend may be instantly verified by the user, before removing the card from the reader 40. Moreover, as will be seen later with reference to FIG. 22, the functions of the block diagram of FIG. 17 may alternatively be implemented by a microcomputer circuit.

Referring now in detail to FIG. 17, the card reader 40 includes a single card in position sensor for emitting a card in position (CIP) signal when the card has been fully inserted into the card reader 40. Additional sensors are provided in the card reader 40 for detecting the beginning of scan and end of scan of the magnetizable strip carried on the card 44 and producing corresponding signals BOS and EOS, respectively. These three control signals, CIP, BOS and EOS are fed to a master controller circuit 250 which controls the proper sequence of operation of the circuit for reading data from the card, cancelling credit, writing data back onto the card and enabling the vend operation.

The controller 250 also receives a composite control signal from an AND circuit 252 which receives inputs from a vend request control 254, actuated by the user when it is desired to initiate the vending of an item, rather than merely reading the credit available on the card. The AND circuit 252 also receives an empty sense signal from the vending machine, here illustrated as a switch 256. Briefly, this switch 256 corresponds to the CPFL signal discussed above and indicates whether articles or items to be vended are present in the machine or the machine is in effect "empty". Thus, before vending is enabled by the controller 250, it is ascertained whether a vend has in fact been requested and whether articles are present in the machine to be vended.

Further inputs to the AND circuit 252 include a machine enable signal derived from an interface circuit which receives suitable input signals from the vending machine so as to prevent the initiation of a new vend cycle until the end of a vend cycle currently in progress. A further credit available signal is derived from a credit display circuit 260, to prevent the initiation of a further vend cycle if no credits remain.

The controller produces forward and reverse control signals (FWD, RVS) for controlling the direction of the motor drive circuit for the read/write head 41. Additionally the controller provides a suitable credit pulse for adjusting the credit available on the card, as will be described hereinbelow and a suitable vend allowed pulse to the machine adapter circuit 258 to permit the vending of an item at the proper time. A suitable oscillator 262 is also provided for the controller circuit 250.

Additional control signals produced by the controller 250 include read mode and write mode control signals to the read/write head 41 by way of suitable intervening logic.

To properly time or synchronize the operation of the circuit with the speed of the moving read/write head a photo interrupter-type sensor 264 includes a slotted disc which is rotated by the same motor that drives the head 41, thus producing a strobe signal which is an analog of the read/write head speed. This signal is fed through a suitable amplifier 266 to a strobe counter circuit 268 which is part of a head positioner circuit 270. This circuit 270 provides suitable head position control signals to enable the read cycle and write cycle when the read/write head 41 is respectively in position to begin either reading or writing from the card 44. In this regard, the head positioner circuit 270 also feeds suitable read or write head position signals to a clock selector circuit 272 which selects either a read clock carried on one track of the card 44 or a write clock from the strobe amplifier 266 for reading from or writing to the card, respectively.

In the read cycle, a peak sensor and threshold detector 274 and pulse generator 276 receive the signals read from the card by the read/write head 41 and process and feed the signals to a clock/data separator or decoder circuit 278. The separated or decoded clock signals comprise the read clock and are fed to the clock selector circuit 272 while the decoded data is fed to a gate 280 which is enabled by the read position signal from the circuit 270. The clock selector further controls the right shifting or clocking of data into a serial-in/serial-out data storage circuit 282 which comprises a 25-bit shift register. The data from the gate 280 is fed to the data input of this shift register 282.

A comparator 284 is provided at selected parallel outputs of the 25-bit shift register 282 for comparing the validation code on the card 40 with the validation code assigned to a particular vending machine, which is preset by a number of switches 286 or other convenient means. The form of the credit and validation data on the card 44 in this embodiment will be discussed in further detail hereinbelow. A credit counter 288 and credit display 290 are fed from the serial data output of the shift register 282, which also feeds a control signal to the comparator 284 by way of an intervening control circuit 292. These circuits and their functions will be described in detail later. Suffice it to say that the credit in the shift register 282 is altered or updated upon the initiation of the vending cycle for purposes of writing the altered credit, that is, with an appropriate amount of credit cancelled for the item to be vended, onto the card 44 at the end of the vend cycle.

To accomplish writing, a serial data output from the shift register 282 also feeds a data encoder 294 which in turn feeds a head driver circuit 296 for causing the read/write head 41 to write the altered credit data back onto the card 44 prior to the vend cycle. The credit controller 250 also includes a mode control line feeding the shift register 282 which controls the register for operation in either a serial mode or a parallel mode as will be described hereinbelow. An additional parallel load control signal is also fed from the controller 250 to the shift register 282. Briefly, the comparator circuit 284 includes means for parallel loading and unloading of the credit data from and to the shift register 282 and means for cancelling a suitable amount of credit prior to the reloading of the shift register, to accomplish the appropriate credit deduction for purposes of a given vend operation.

Referring briefly to FIG. 21, the encoding arrangement of the credit card utilized with the embodiment illustrated in block form in FIG. 17 is shown. Briefly, a 12-bit operator or validation code comprises the right-hand 12 bits encoded on the card. The credits are carried in BCD form, including four bits for a unit's credit and four bits for tens credit. As with the embodiment of FIG. 1 a credit may represent any arbitrary monetary sum selected, for example, one cent, five cents or ten cents. Hence, the maximum monetary amount of credit available on a card encoded in the form shown in FIG. 21 depends upon the monetary unit chosen to coincide with a single or unit credit. A longitudinal redundancy character comprises the left-hand most four bits of information carried on the card and acts as a check upon the integrity of the BCD-encoded credit stored up thereupon, as will be explained later.

Figure 18A:
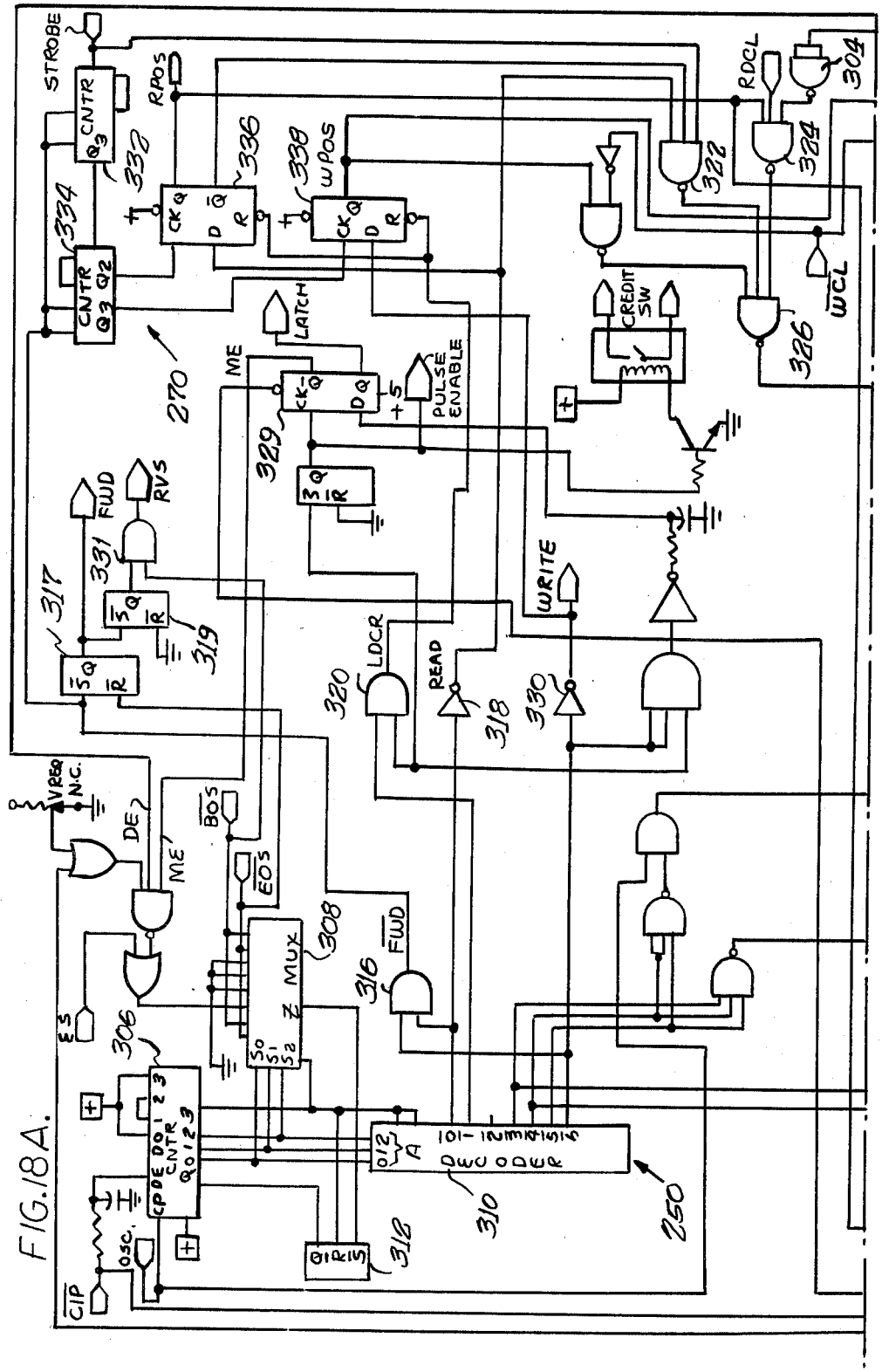
FIGS. 18A, 18B, 19 and 20 together form a circuit schematic diagram illustrating various details of the circuit of FIG. 17.
Figure 18B:
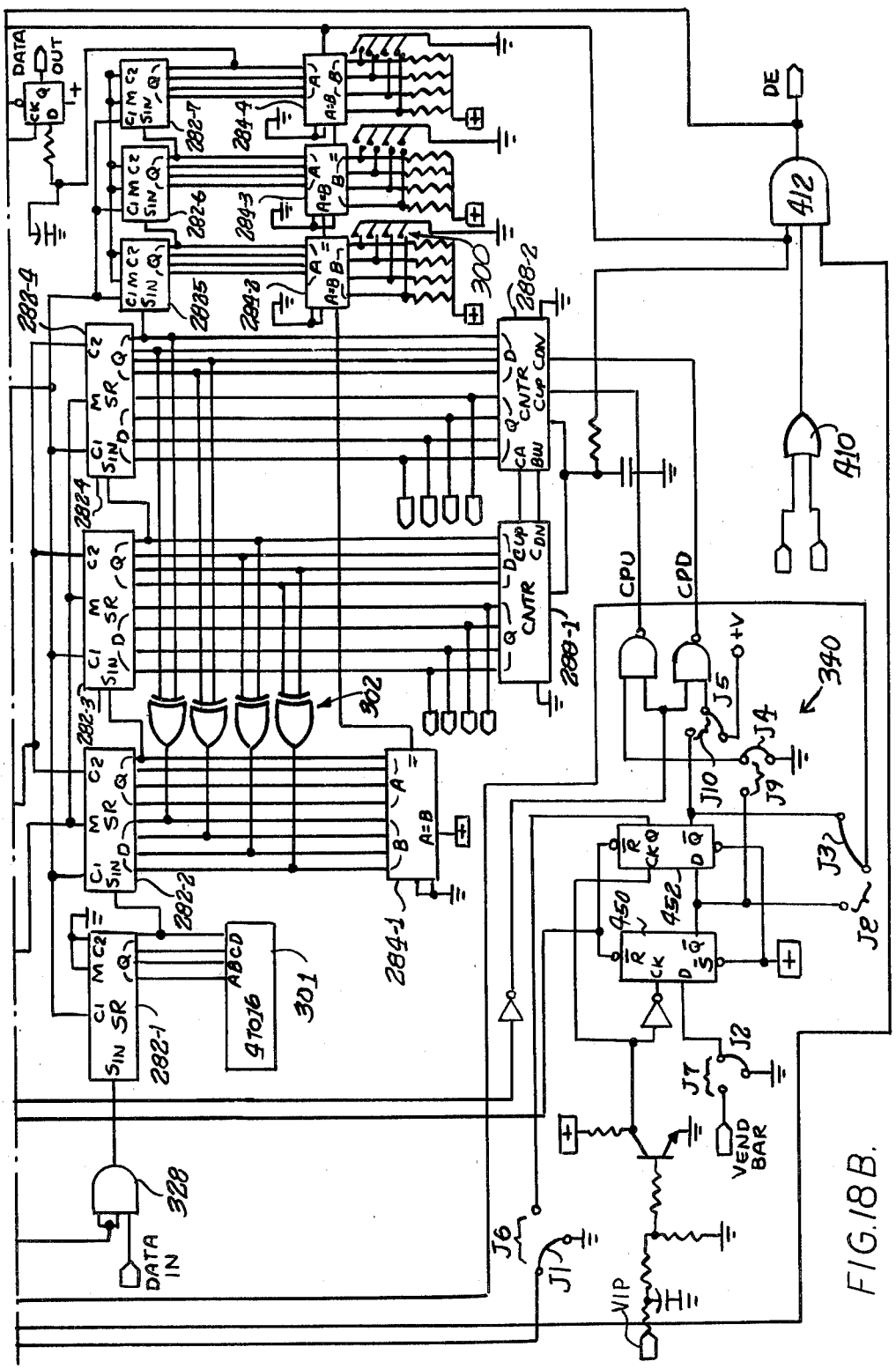

Referring now to FIG. 18 (formed by FIG. 18A positioned above and vertically aligned with FIG. 18B), portions of the circuit of FIG. 17, including the controller 250, shift register 282, comparator 284, and credit counter 288 and related circuits are illustrated in circuit schematic form. The shift register 282 includes seven 4-bit shift registers of the type generally designated 74LS95 and designated by respective reference numerals 282-1 through 282-7, inclusive. These shift registers are serially interconnected so that when serially fully loaded from the card 44 the shift registers 282-5, 282-6, and 282-7 contain the 12-bit validation code, while the shift registers 282-3 and 282-4 carry the BCD-encoded credit and the shift register 282-2 carries the four bits of longitudinal redundancy character. The comparator 284 includes four 4-bit comparators designated 284-1, 284-2, 284-3 and 284-4. The first comparator 284-1 is coupled with the shift register 282-2, while the comparators 284-2, 284-3 and 284-4 are coupled with the shift registers 282-5, 282-6 and 282-7, respectively. These latter three comparators also receive pre-encoded machine validation codes from suitable means such as pre-settable switches, designated generally by the reference numeral 300, which may be used to set the validation code for a particular machine. The first shift register 282-1 has its four stages coupled in parallel with the four inputs of a 4-to-16 decoder 301. These components are used in a modified form of the invention to be described later.

The comparator 284-1 receives one set of compared inputs from the shift register 282-2 and another set of inputs from an array of four exclusive-OR gates designated generally by the reference numeral 302, each of which receives inputs from two selected ones of the bits of the respective shift registers 282-3 and 282-4. Hence, any change in the binary coded credit data will change the state of the associated exclusive-OR gate 302 and hence fail to produce a comparison with the 4-bit redundancy character carried in the shift register 282-2.

Moreover, these exclusive-OR gates also feed parallel data inputs of the shift register 282-2 for altering the redundancy character carried therein to coincide with the remaining credit after a credit cancellation during a vend cycle. Hence, in order to validate a card, all four comparators 284 must detect a comparison between the two sets of data fed thereto. This process requires both that the card validation code is correct and that the credit amount carried thereon coincides with the redundancy character to enable the write portion and vend portions of the cycle. To this end, the compare outputs of these four comparators are serially connected to produce a compare enabling signal to a NAND gate 304 which is wired as an inverter.

During the read operation, the strobe signal from the amplifier 266 of FIG. 17 is selected at the clock selector 272 which comprises three, 3-input NAND gates 322, 324 and 326. Since the data from the card has not yet been enabled, the strobe signal shifts a series of zeros through the shift register 282 to clear the register preparatory to card reading. When the read/write head is in position for reading the card, a read position (RPOS) signal causes a read clock signal (RDCL) to be passed through the gates 324 and 326 to clock the shift register, and enables a further gate 328 to allow the data stream to be serially clocked into the shift registers 282. The shifting continues until a compare condition is reached at all of the comparators 284, at which point the read clock is disabled at NAND gate 324 by way of the inverter 304.

The credit counter 288 comprises a pair of 4-bit up-/down counters 288-1 and 288-2 which are wired in parallel with both the data inputs and data outputs of the shift registers 282-3 and 282-4 for both receiving the credit data therefrom during the read cycle and altering the credit data thereon during the write cycle. As mentioned above, these shift registers may operate either in serial fashion or in parallel fashion depending upon the control signals fed to control inputs thereof from the controller circuit 250.

This controller circuit 250 comprises a 4-bit counter circuit 306, an 8-to-1 multiplexer 308, a three-line-to-eight-line decoder 310 and an RS flip-flop 312. In the illustrated embodiment the counter 306 is a synchronous, stoppable counter of the type generally designated 74LS162, while the 8-to-1 multiplexer 308 is of the type generally designated 74LS151 and the 3-to-8 decoder is of the type generally designated 74LS138.

When a card has been properly inserted into the card reader the card in position signal $\overline{\text{CIP}}$ goes to a logic 1 allowing the counter 306 to reset to zero. The first three order bit outputs are coupled to the three inputs of the 3-to-8 decoder 310, thus driving the zero ($\overline{0}$) output line thereof low and generating a forward (FWD) head control signal, by way of a suitable gate 316 and an RS flip-flop 317, and also generating a read (READ) signal by way of an inverter buffer 318. The outputs of the controller 250 comprise the outputs of the 3-to-8 decoder 310. The state of these outputs remains the same until the end of scan signal (EOS) goes low or to logic 0 level. This signal is fed to the reset input of the flip-flop 317 and also to the 0-bit position and 6-bit position of the 8-to-1 multiplexer 308. It will be noted that the multiplexer 308 is also driven from the 3-bit outputs of the counter 306 which drive the inputs of the 3-to-8 decoder 310. Hence, the multiplexer 308 will initially be in a zero state such that when EOS goes low the Z output thereof will also go low hence triggering the RS flip-flop 312 to apply an enabling signal to the enable input (CET) of the counter 306, causing the counter to progress to count 1. Accordingly, the not one (1) output line of the decoder 310 will now go low generating a control signal LDCR by way of a suitable AND gate 320 to begin loading the credit counter 288 from the shift register 282. The Q output of flip-flop 317 also drives the set ($\overline{S}$) input of a second RS flip-flop 319, the Q output of which feeds one-input of a two-input AND gate 331. The $\overline{\text{BOS}}$ signal feeds the other input of AND gate 331, whose output forms a reverse (RVS) motor control signal.

The motor is then reversed until the beginning of scan position is reached, whereupon the BOS signal to the multiplexer 308 allows the counter 306 to progress. States 3, 4 and 5 are then sequenced, since inputs 3, 4 and 5 of the multiplexer 308 are all tied to ground. These three states generate the control signals to carry out parallel loading of the shift registers 282 from the up/down counter 288 to begin the write cycle. The next two output states 6 and 7 of the decoder 310 control the write cycle. Accordingly, the BOS and EOS signals again control the 6- and 7-bits of the multiplexer 308 to generate the appropriate signals for driving the head to scan the card, writing the altered credit data thereon and at the same time re-writing the validation code thereon. The controller circuit then repeats the first two states thereof so that the card may be re-read, and the credit data thereon displayed at the end of the write cycle to verify the proper completion thereof. So long as the card remains in the card reader, the controller remains in its state 2 position, which is the bit-2 output of the 3-to-8 decoder, which it will be seen is effectively a neutral position, having no output connection.

At this point it will be instructive to briefly review the sequence of operation of the circuit of FIG. 17, as embodied in the circuits of FIGS. 18A, 18B, with reference to the various control functions to be performed concerning the driving of the movable read/write head 41 for reading and writing the card 40 and achieving proper credit control and machine control therefrom. In this regard reference is invited to FIG. 23 comprising a general flow chart of system operation.

When no card is present in the card reader 40, the system is in a reset state or mode. Upon insertion of a card fully into the card reader 40 the card in position sensor is tripped generating the card in position signal (CIP). Accordingly, read circuitry is enabled and the card is read while being scanned by the moving read/write head 41. If the validation code matches the preset validation code of the vending machine, as preset on the comparators 284-2, 284-3 and 284-4, the display enable (DE) will be actuated to display the credits available on the card. This display enable function further requires that the redundancy character be correct, as discussed above, and that some minimum amount of credit remain on the card. After the credit has been displayed, a machine enable (ME) signal is generated and remains active until the vend cycle is complete. If the vending machine is empty, that is, no articles remain to be vended, an empty sense signal (ES) will deactivate the cycle, otherwise the vend request buttom (VREQ) will be active and may be actuated by the user to initiate a vend.

Upon actuation of the vend request control by the user the appropriate amount of credit is cancelled from the up/down counters 288-1 and 288-2 and the remaining credit is loaded into the shift register stages 282-3 and 282-4. At the same time a new longitudinal redundancy character (LRC) is loaded into the shift register stage 282-2 by way of the exclusive-OR gates 302. When the new credits and LRC have been loaded into the shift register, the LRC, credits and validation code are re-written to the card. When the foregoing operations have been completed the machine is enabled for vending the selected item. At the same time, the card is being re-read for display of the remaining credits. When the vend is complete, the machine enable (ME) is reset and the system returns or resets to wait for another vend request (VREQ). If, prior to a vend request the card is removed, the CIP signal goes to its opposite state causing the system to reset.

Figure 24:
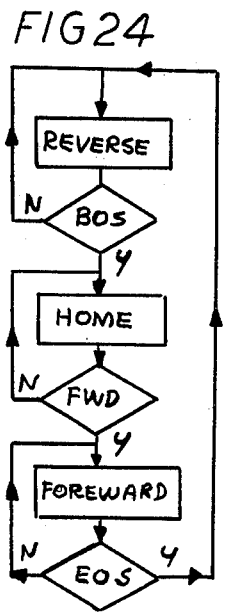

The sequence of motor control for the head drive motor will be best understood from reference to the flow chart of FIG. 24. The motor control utilizes two position switches, the beginning of scan (BOS) and end of scan (EOS) switches which are located substantially at opposite extremes of the card. The motor control 40 of FIG. 17 is designed to actuate the head in a reverse direction until it reaches the BOS position, if not already there when the system is energized initially. The head will remain at this beginning of scan or "home" position until the forward drive control signal (FWD) is received from the controller 250. The motor then drives the head forward until the EOS sensor is activated, whereupon it immediately goes into reverse until the head reaches the opposite extreme, again actuating the BOS sensor. At this point the head will come to rest until re-activated by another FWD control signal.

Figure 25:
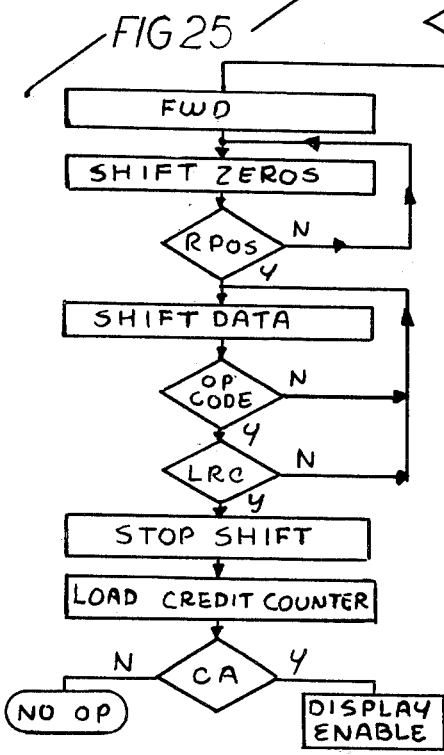

Referring to FIG. 25, a further flow chart illustrates the operation of the card reading cycle. Initially, the system remains reset until the card in position (CIP) signal is generated by the card in position sensor in the card reader 40. At that point the head is driven forward and zeros are shifted into the shift registers 282, as described above, to clear all the registers. When the read position signal (RPOS) is generated the data is fed from the read/write head through the decoding circuitry to be described below, and loaded into the shift registers 282. When the card validation code and redundancy character are detected at the comparators 284, the shifting stops and the registers hold the data and also load the credit area into the credit counter 288. While the credit counter is being loaded, the motor is in its reverse cycle, repositioning the head at its beginning of scan position. At this same time, head positioning latches (to be described below with reference to FIG. 18) are also cleared.

Figure 26:
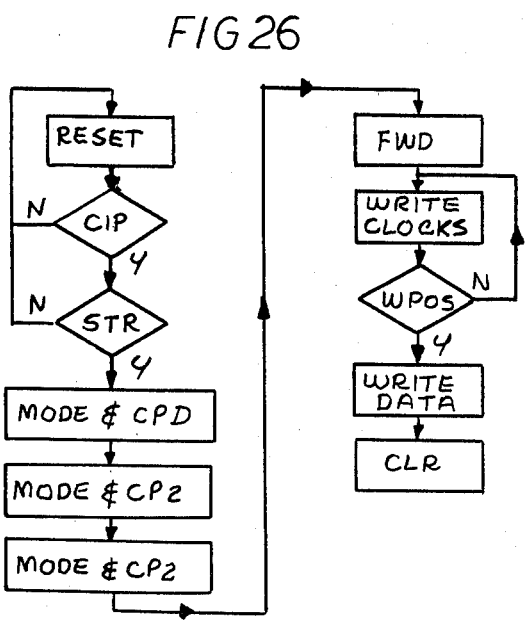

Upon completion of the read sequence and credit loading and credit cancellation, as described above, the revised credit data may be re-written onto the card. Reference is next invited to FIG. 26 wherein a flow chart of the write sequence is illustrated. The system again is initially in its reset position, and requires that the card remain fully inserted in the card reader 40, thereby giving the card in position (CIP) signal. A start (STR) is then generated by the presence of the machine enable, display enable, vend request and empty sense signals, as described above, at the AND circuit 252 of FIG. 17. The mode and CPD signal is generated causing the credit data in the counters 288 to be decremented by the appropriate amount, and the mode signal is then held for parallel loading of the credit and LRC registers while these registers 282-3 and 282-4 and 282-2 are pulsed twice at their CP2 control inputs by the controller 250. The first pulse causes loading of the new credit code into the credit registers 282-3 and 282-4 while the second pulse loads the LRC derived from the new credits into the LRC registers 282-2. When the loading is completed, as mentioned above with respect to the flow chart of FIG. 25, the motor is again driven forward to re-record the clock pulses on the card. When the write position signal (WPOS) is given the data is applied to the head to be recorded from the shift registers 282. A clear pulse (CLR) is then applied to the head positioning latches of FIG. 18.

Referring again to FIG. 18, a head position detector circuit 270 includes a pair of 4-bit binary counters 332 and 334 and a pair of D-type flip-flops 336 and 338. At rest, the head 41 is off the card 44 by approximately 0.130 inch, and additionally, there is about a 0.290 inch space from the edge of the card before the beginning of recorded data thereon. Accordingly, the head must travel approximately 0.420 inch before reading the data. Head positioning is therefore accomplished by counting the strobe pulses produced by the photo interrupter 264 received by way of the amplifier 266 of FIG. 17. (The counters 332 and 334 comprise the strobe counter 268 of FIG. 17). A lead screw of 11 turns to the inch drives the head and also rotates a 27-slot disc of the photo interrupter 264. Consequently, each slot counted represents approximately 0.0337 inch of travel of the head. Thus, 125 strobes will be produced for 0.420 inch of movement of the head. Since the eighth most significant bit in binary corresponds to 128, the two counters 332, 334 are cascaded and the eighth most significant bit is utilized to latch the flip-flop 338 to generate the write signal (WPOS) for a write operation. For a read operation, the head is enabled prior to the point at which data is recorded and accordingly the read position signal (RPOS) is given in response to latching of the flip-flop 336 at the seventh most significant bit from the counter 334 or after 64 strobe pulses. The counters are enabled on the first stroke of the head by the $\overline{FWD}$ signal at AND gate 316.

Remaining logic driven from the controller circuit portion 250 of FIG. 18 energizes a D-type flip-flop 329 which drives a D.C. enable or head position latch at the appropriate points in the cycle of operation. The empty sense signal (ES) is also received by way of suitable logic at the multiplexer 308 bit two input. Referring to the bottom left-hand corner of FIG. 18, suitable logic circuitry, designated generally 340, is provided for controlling the up and down directions of counting of the up/down counters 288-1, 288-2 in order to add or subtract from the credit count stored there as appropriate to the machine operation. In most cases this circuit will be utilized only to cause a down count at the proper time to subtract the appropriate amount of credit. However, as will be described hereinbelow, should an error occur, the circuit may also be utilized to restore a credit to the up/down counter 288 (i.e., counting up) and hence to the shift register 282 to be re-written onto the card 44.

Figure 19:
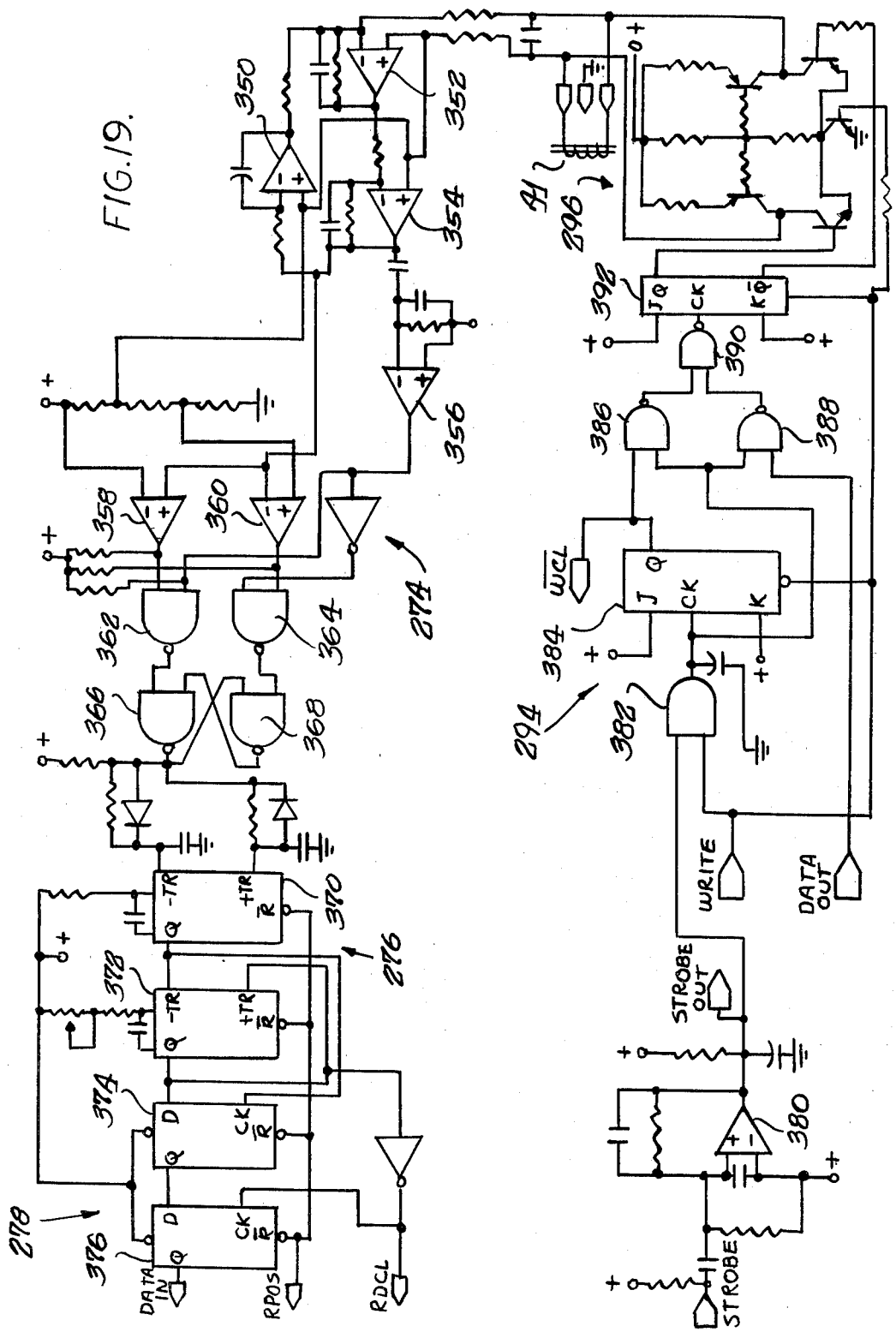

Reference is next invited to FIG. 19, wherein suitable interfacing circuit for decoding the data read from the card 44 by the head 41 and for encoding of data to the head for writing on the card 44 is illustrated. The read/write head 41 is here illustrated as a magnetic coil which receives write signals from the data encoder 294 and feeds signals read from the card to the peak sensing and threshold detector circuit 274.

In the illustrated embodiment, this peak sensing circuit comprises three operational amplifiers 350, 352 and 354 arranged to detect the peak signal from a biphase signal of on the order of six millivolts produced by the read/write head 41 in response to the data encoded on the card 44. The output of this peak sensing circuit is AC-coupled to a differentiator comprising an operational amplifier 356 and is also directly coupled to a plus and minus threshold detector comprising a pair of operational amplifiers 358 and 360. This threshold detector detects a signal excursion of greater than on the order of 5.0 volts or less than on the order of 4.167 volts, while the differentiator phase shifts the signal on the order of 90°. The outputs of the threshold detectors and differentiator are logically compared in four NAND gates 362, 364, 366 and 368 to trigger a pulse generator comprising a flip-flop 370 whenever a positive threshold crossing is followed by a positive peak or a negative threshold crossing is followed by a negative peak.

This pulse generator comprising the flip-flop 370 in turn triggers a second pulse generator comprising a similar flip-flop 372. The period of the first pulse generator is on the order of 17 microseconds while the period of the second pulse generator is on the order of 1.67 milliseconds. This 1.67 millisecond pulse period is substantially 75% of the period between clock pulses encoded on the card 44 which is on the order of 2.23 milliseconds. Hence, the 1.67 millisecond pulse stream effectively windows the spaces between the clock pulses with a 25% tolerance for motor speed variation of the motor driving the read/write head 41. Consequently, if a data pulse occurs between clock pulses it is decoded as a logic 1 while if no data pulse occurs between clock pulses it is decoded as logic 0.

Figure 27:
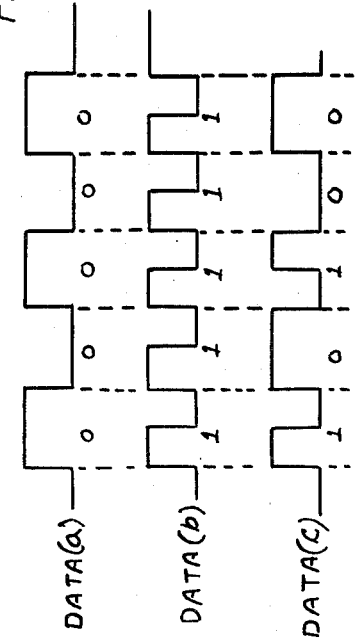
FIG. 27, FIG. 28 and FIG. 29 are waveform or timing diagrams illustrating aspects of the operation of the circuits of FIGS. 18A, 18B, 19 and 20.
Figure 28:
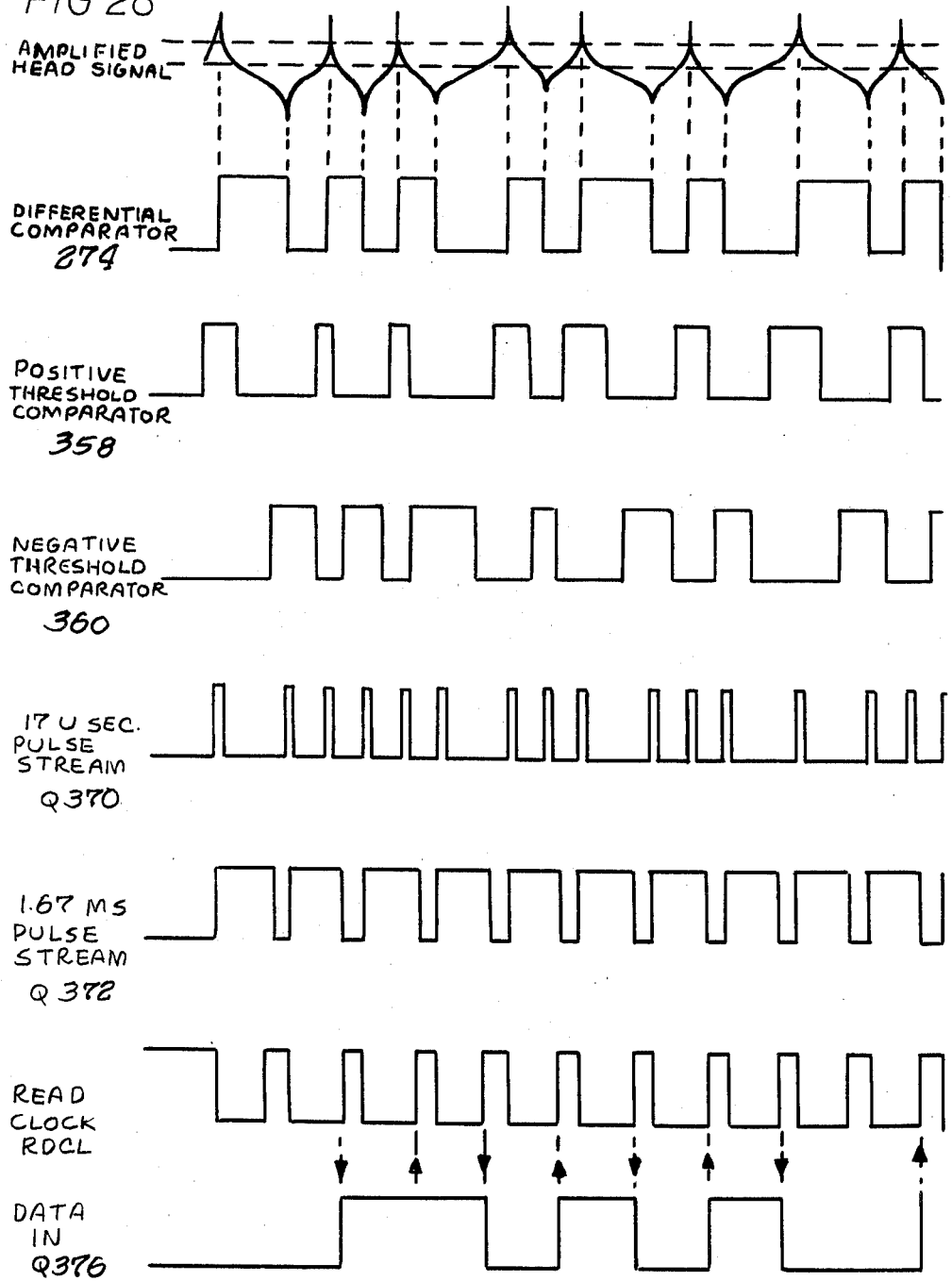

A pair of D-type flip-flops 374, 376 are coupled to separate the data from the clock pulses in this manner. Reference is invited to FIG. 27 and FIG. 28 which illustrate the timing and waveforms involved in the decoding process of the circuits just described. In FIG. 27 a representative clock pulse train is illustrated, together with three different examples of data recorded on the card and how these data are decoded by the above-described circuit as either logic 1's or logic 0's. FIG. 28 illustrates the waveform generated by the read/write head 41 and the waveforms produced in response thereto by the peak detector, threshold comparators, pulse generators and data separator.

The data encoder circuitry 294 receives data from the shift registers 282 and converts or encodes it into a suitable form for writing the data back to the card 44 after the credit has been read and displayed and a suitable amount of credit has been subtracted for the desired purchase, but before the vend operation is enabled, as discussed above. This encoding circuit includes a biphase encoder for encoding both the data and the clock signals into a single signal for writing onto the single data track of the card 44. The strobe signal derived from the moving read/write head, as described above with reference to FIGS. 17 and 18, is utilized to clock the writing of data back onto the card. This signal is passed through comparator 380 to one input of a two-input NAND gate 382 which is enabled by the write enable signal from FIG. 18.

Figure 29:
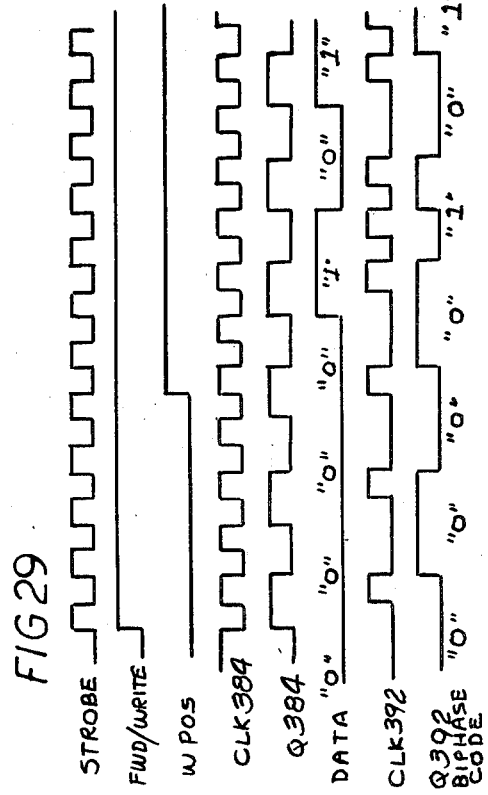

This NAND gate 382 feeds the clock input of a first JK flip-flop 384, the Q output of which feeds a further NAND gate 386, the remaining input of which is fed directly from the output of NAND gate 382. A similar NAND gate 388 receives the data from the shift registers 282, from the data output terminal thereof illustrated in FIG. 18. The remaining input of the NAND gate 388 is also fed directly from the output of the NAND gate 382. These two latter NAND gates 386 and 388 feed the inputs of a further two-input NAND gate 390 whose output feeds the clock of a second JK flip-flop 392. The Q and $\overline{Q}$ outputs of the flip-flop 392 feed the head driver circuit 296 which comprises a transistorized current switch. This head driver circuit 296 feeds the biphase encoded signal to the read/write head 41 for writing the encoded clock and data information back onto the card 44. The encoding operation is further illustrated by the waveforms of FIG. 29, wherein the strobe, forward (FWD)/write and write position (WPOS) signals are illustrated, together with the signals produced at the clock and Q terminals of the flip-flop 384. Also illustrated is the data train of logic zeros and logic ones received from the shift register 282, the waveforms produced at the clock terminal of the flip-flop 392 and the resultant biphase encoded signal produced at the Q output of the flip-flop 392, it being understood that the $\overline{Q}$ output thereof produces the same signal, but in the opposite sense.

Figure 20:
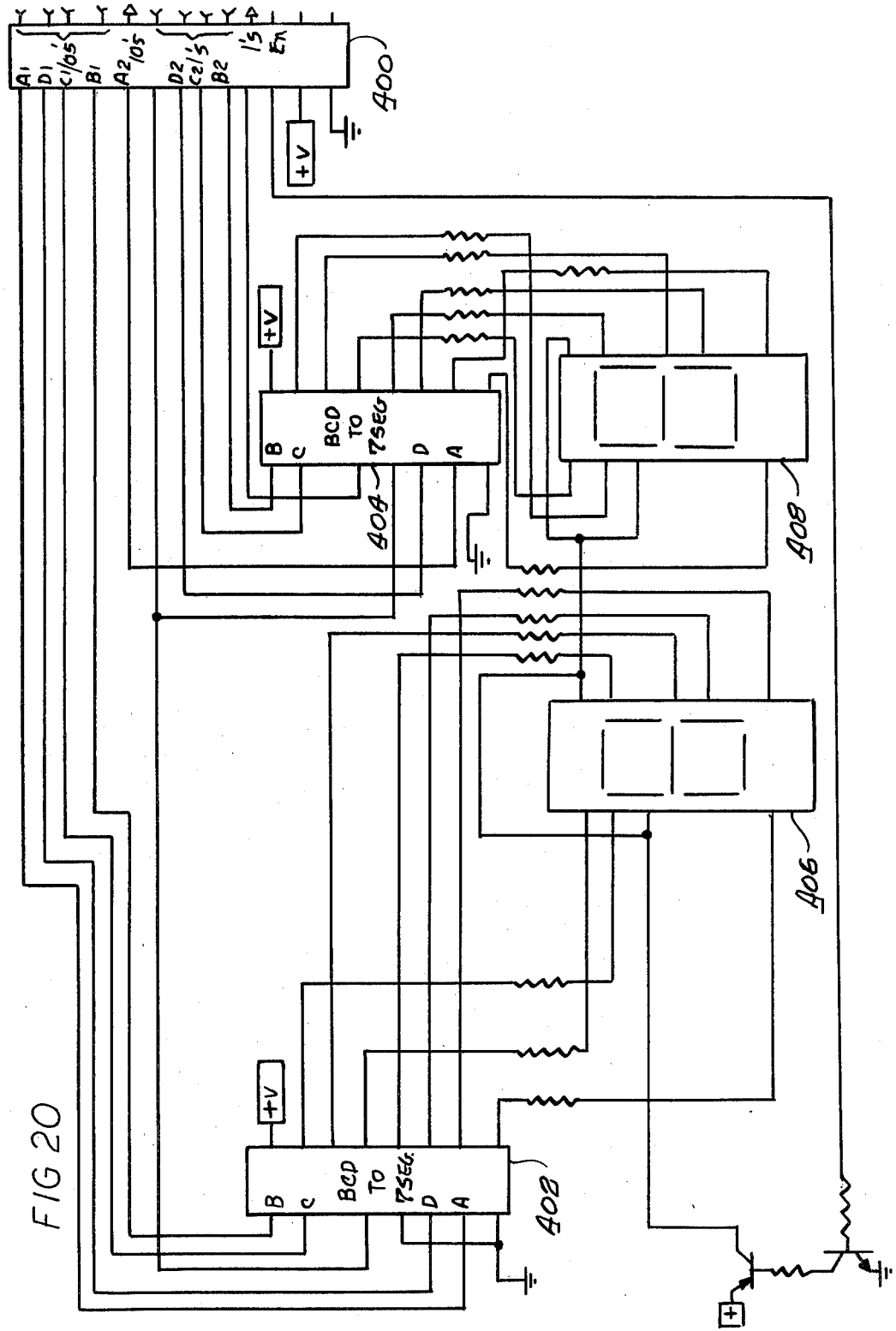

Referring to FIG. 20, the display circuit 290 is illustrated in detail. An interface connector 400 receives the two 4-bit BCD encoded credit words from the up/down counters 288-1 and 288-2 of FIG. 18. This credit information is fed to a pair of BCD-to-seven segment decoders 402 and 404 which in turn drive a pair of seven segment display characters 406 and 408. The operation of this display circuitry is conventional and need not be described in detail.

The display circuits 402 and 404 also form inputs to a two-input OR gate 410 of FIG. 18 (lower right corner of FIG. 18B). The output of this OR gate 410 produces a credit available (CA) signal which indicates that at least one unit of credit remains on the card. This credit available (CA) signal is further combined in an AND gate 412 with the card in position (CIP) signal and a control signal (HALT) produced when any of the comparators 284 detect a comparison of the data read from the card with the validation data or the redundancy character data. The output of the AND gate 412 comprises a display enable signal which is fed back as an enable signal for enabling the display circuit of FIG. 20.

Referring now to FIG. 22 (drawing sheet 7), as discussed above all of the functions of the foregoing circuits of FIGS. 17 through 20 may be performed by a microprocessor, for example of the type designated PIC1650, available from the General Instrument Company, Hicksville, L.I., N.Y. Other similar microprocessor components may be utilized for example Mostek MK3870, or National Semiconductor MM5799 or MM57140. Suitable interfacing circuitry 422, whose design is well-known to those skilled in the art is utilized between the data input/output ports of the microprocessor 420 and the interacting terminals of the vending machine 424 with which the invention is to be utilized. These components 422 also interface with the card read/write and head control elements 426, and with a suitable display circuit 428, which may be substantially similar to those shown and described with reference to FIGS. 19 and 20.

A microprocessor of the type designated PIC1650, as mentioned above, was programmed for use in a vending machine in a co-pending application of William R. Hoskinson and William V. Machanian, Ser. No. 065,611 filed Aug. 10, 1979, now U.S. Pat. No. 4,282,575 to which reference is invited. Accordingly, the general principles involved in the programming of such a microprocessor for use in a vending machine control system need not be described herein. The flow charts of FIGS. 23 through 26, inclusive, would enable one skilled in the art to program such a microprocessor for operation in accordance with the present invention without undue experimentation.

Figure 30:
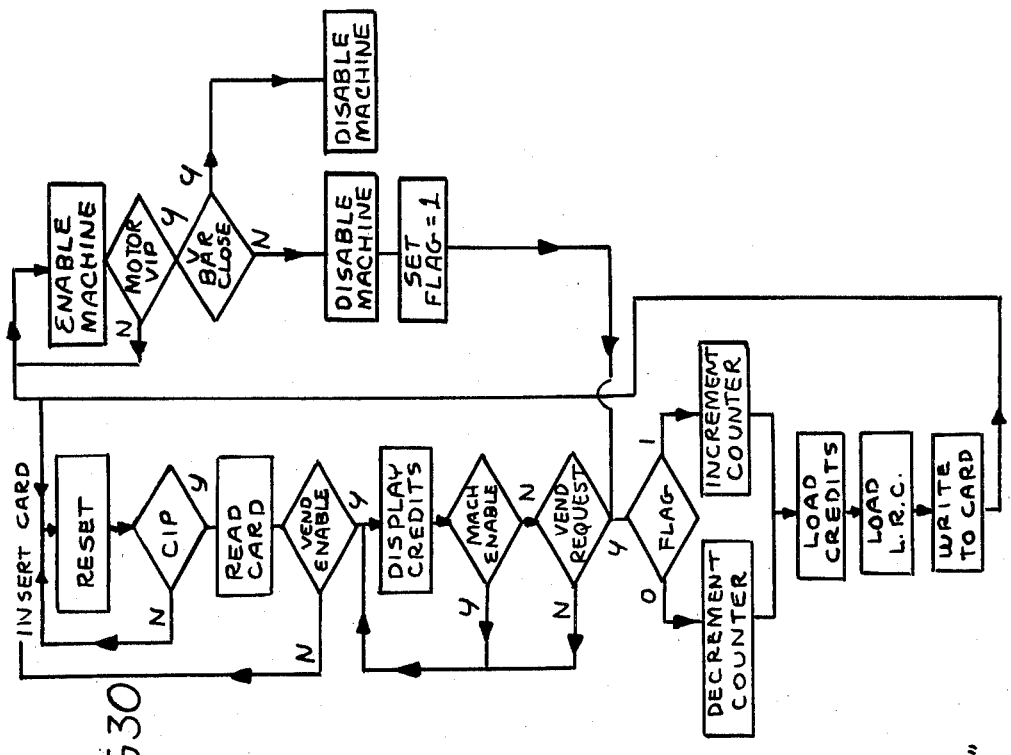
FIG. 30 is a flow chart illustrating a modified form of operation of either of the embodiments of FIGS. 18A, 18B, 19 and 20 or of FIG. 22.
Figures 31, 32, 33:
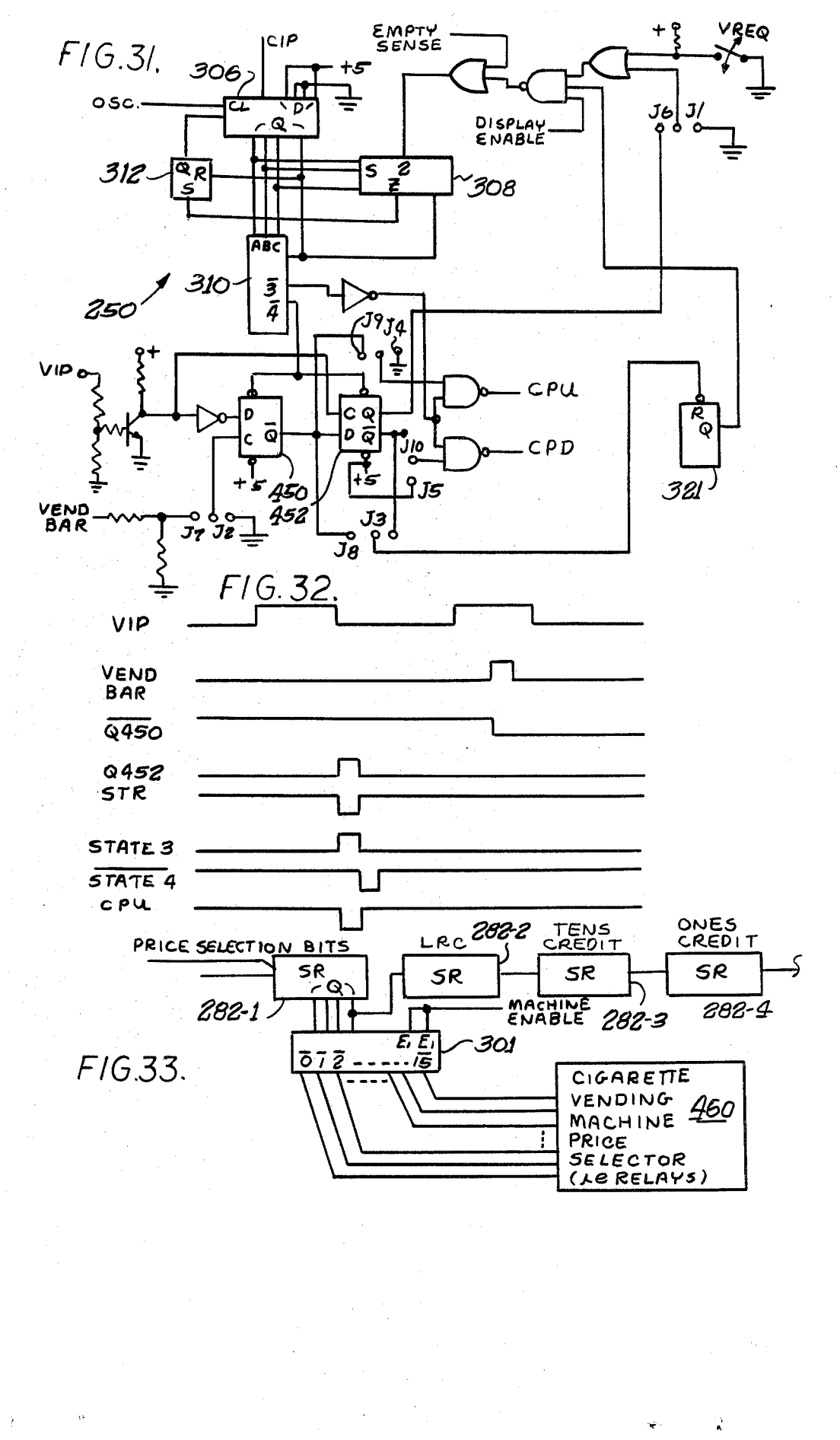

Reference is next invited to FIG. 30 and FIG. 31 wherein a modification to the circuit of FIG. 18 and a flow chart illustrating the operation thereof are illustrated, respectively. This modified circuit is for use with a cigarette vending machine, wherein a number of different brands may be available for vending at the same price, however, there is no empty sensing switch (ES) for each brand. Rather, a single vend bar is utilized to generate a signal which indicates that a package of the selected brand has been dispensed. Absence of this vend bar signal indicates that the portion of the vending machine normally holding a supply of that brand is empty.

It will be remembered, however, that credit is deducted from the card prior to the vend operation, whereas this empty vend bar signal would not be generated until the end of the vend operation. Accordingly, the circuit of FIG. 31 permits the deducted credit to be reinstated on the card 44 should the selected brand be unavailable, as indicated by the absence of a vend bar signal. The circuit of FIG. 31 connects at the indicated points with the circuit of FIG. 18.

Referring now more particularly to FIG. 31, the illustrated circuit cooperates with the circuit associated with the up/down counters 288-1 and 288-2 of FIG. 18 to cause the counter to count up, thereby adding a credit, should the vend bar signal be absent. To this end, a pair of D-type flip-flops 450, 452 (also shown in FIG. 18) are arranged to receive both the vend in process (VIP) signal and the vend bar signal and to actuate the CPU terminal of the units credit counter 288-2 of FIG. 18 if the vend bar signal is not generated during the vend in process signal, thereby reinstating and re-writing the original credits read from the card 44. If the vend bar signal is generated, indicating the vending of the selected item, these flip-flops 450 and 452 actuate the CPD terminal of the up/down counter 288-2 of FIG. 18 in the normal fashion to complete the vending operation.

In this regard the controller 250 components are again illustrated in FIG. 31 to show their connections to the circuit comprising the flip-flops 450 and 452. The logic components from the display enable, empty sense and vend request control signals to the controller 250 and the machine enable latch 329 of FIG. 18 have also been included in FIG. 31 to illustrate the interconnections thereof with the circuit comprising the flip-flops 450 and 452.

The modification comprises a number of jumpers in FIG. 31 for selectively enabling this circuit either for operation in a cigarette vending machine or for operation with vending machines other than cigarette vending machines, in the manner heretofore described. Briefly, in a cigarette machine the points jumpered are J6 through J10, inclusive while for a non-cigarette machine this circuit is effectively disabled by jumpering points J1 through J5, inclusive.

Referring to FIG. 32 a timing diagram for the operation of the circuit including the flip-flops 450 and 452 is illustrated.

Figure 23:
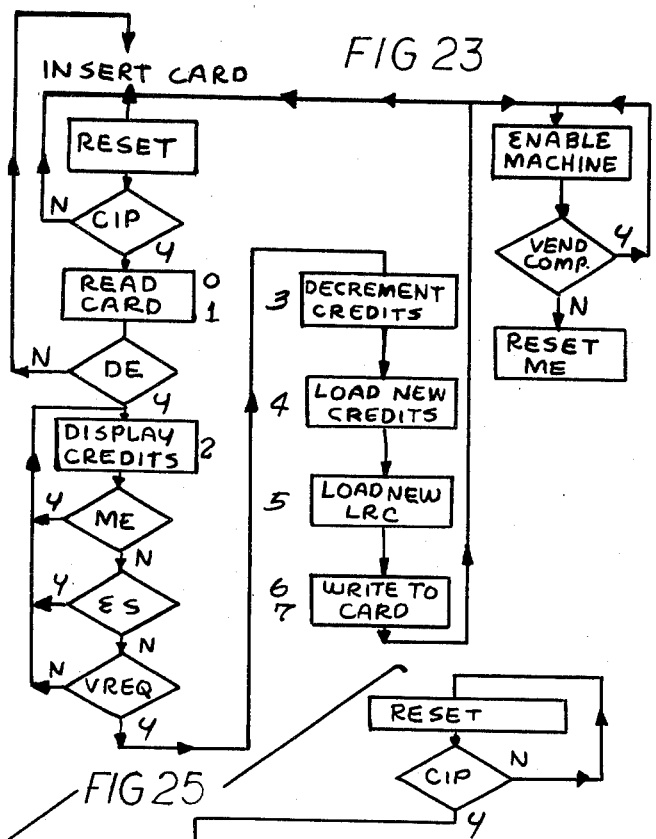
FIGS. 23, 24, 25 and 26 are flow charts of the operation of either of the embodiments of FIGS. 18A, 18B, 19 and 20 or of FIG. 22.

As illustrated by the flow chart of FIG. 30, this circuit modifies the general operational flow chart of FIG. 23 by inserting a flag function (FLAG). This function corresponds to the detection or lack of detection of the vend bar signal so as to either decrease the credits in normal fashion or replace a credit in the absence of the vend bar signal as discussed above. In this regard, the vend bar closure sensing function is inserted after the machine enable and vend in process functions to disable the machine and set the flag as necessary to complete the vend operation for a cigarette machine, as discussed above.

Referring now to FIG. 33 an additional optional feature for use with cigarette vending machines is illustrated together with a cooperating portion of the shift register 282 of FIG. 18. Briefly, the "extra" shift register component 282-1, together with the 4-to-16 decoder 301 which have no function in the embodiment of FIG. 18 are used in this modified form. The cigarette vending machine may include brands with different pricing, whereby a card 44 having a different value per credit must be utilized to buy a brand which is priced differently. Accordingly, an additional four bits of data may be added to the data encoded on the card to represent one of sixteen different pricing levels. A suitable array of relays is indicated schematically by reference numeral 460 and is utilized to encode the sixteen different pricing levels. Accordingly, the 4-line-to-16-line decoder 301 (e.g. 74154) receives the 4-bit pricing code of the card 44 from the shift register 282-1 and decoded into one of the sixteen prices to actuate the suitable relay for vending only the brand or brands which bear that price.

What has been shown and described herein is a novel record operated control system for a vending machine. While the invention has been described hereinabove with reference to preferred embodiments, the invention is not limited thereto. On the contrary, those skilled in the art may devise various alternatives, changes and modifications upon reading the foregoing descriptions. Hence, the invention includes such alternatives, changes and modifications insofar as they fall within the spirit and scope of the appended claims.

The invention is claimed as follows:

1. A record operated control system for a vending machine comprising: a record reading/writing means, means for effecting relative movement between a record and said reading/writing means, decoding means coupled with said record reading/writing means for decoding data read from a record thereby upon said relative movement, data storage means coupled with said decoding means for receiving and storing said decoded data, comparing means for comparing at least a portion of said stored data to predetermined data and for producing a compare signal if said data compare, credit altering means responsive to said compare signal for altering the stored data in accordance with the amount of credit required to vend a selected item, encoding means coupled with said storage means and with said record reading/writing means for causing writing of said altered stored data onto said record, and vend enable means responsive to said compare signal and to said credit altering means and to said encoding means for enabling the vending of said selected item only after said altering and said writing of said stored data.

2. A system according to claim 1 and further including control means for controlling the sequence of operation of said decoding means, said data storage means, said comparator means, said altering means, said encoding means, and said vend enabling means.

3. A record operated control system for a vending machine including a record reading/writing apparatus having read/write head means for reading and writing data on a record during relative movement between said record and said read/write head means, said control system comprising: decoding means coupled with said read/write head means for decoding data read from said record thereby, data storage means coupled with said decoding means for receiving and storing said decoded data, comparing means for comparing at least a portion of said stored data to predetermined data and for producing a compare signal if said data compare, data altering means responsive to said compare signal for altering the stored data in accordance with the amount of credit required to vend a selected item, encoding means coupled with said storage means and with said read/write head means for causing writing of said altered stored data onto said record, vend enable means responsive to said compare signal and to said altering means and said encoding means for enabling the vending of said selected item only after said altering and said writing of said stored data, and control means for controlling the sequence of operation of said control system in a predetermined sequence.

4. A system according to claim 3 wherein said control means includes means responsive to continued presence of a record in said record reading/writing means for enabling repeated cycles of operation of said control system.

5. A system according to claim 1 or claim 3 wherein said record carries credit data and validation data and wherein said decoding means is operative for decoding both said credit data and said validation data and said data storage means is operative for storing both the decoded credit data and the decoded validation data, and wherein said comparing means includes means for presetting desired validation data and for comparing said preset, desired validation data with the decoded and stored validation data and for producing said compare signal if said data compare.

6. A system according to claim 3 further including credit enabling means responsive to said stored, decoded credit data for enabling said vend enable means only if said stored, decoded credit data corresponds to an amount of credit equal to or greater than a predetermined minimum amount of credit required for the vending of said selected article.

7. A system according to claim 5 wherein said record further carries credit verification data corresponding in a predetermined fashion to said credit data, and wherein said decoding means is operative for decoding said credit verification data, wherein said data storage means includes means for receiving and storing said decoded credit verification data and wherein said comparing means further includes means for comparing said credit verification data with said credit data and for producing said compare signal only if the data compare.

8. A system according to claim 1 or claim 3 wherein said data storage means comprises shift register means.

9. A system according to claim 8 wherein said shift register means comprises serial-in/serial-out means.

10. A system according to claim 8 wherein said shift register means comprises both serial-in/serial-out means and parallel-in/parallel-out means and means for selectively choosing one of said serial-in/serial-out means and said parallel-in/parallel-out means.

11. A system according to claim 9 wherein said credit altering means comprises means coupled with said serial-in/serial-out shift register means and responsive to said compare signal for shifting said serial-in/serial-out shift register means to achieve cancellation of credit data therefrom.

12. A system according to claim 10 wherein said credit altering means comprises up/down counter means coupled with said shift register parallel-in/parallel-out means for receiving said decoded, stored credit data and responsive to said compare signal for counting down so as to decrease the amount of credit by the amount of credit required for the vending of said selected item, and for altering the credit data in said shift register to coincide with said decreased credit.

13. A system according to claim 5 and further including display means coupled to said storage means for displaying the stored credit data.

14. A system according to claim 13 wherein said display means further includes means responsive to said compare signal for displaying said stored, altered credit data.

15. A system according to claim 11 and further including display means for displaying the decoded, stored credit data and counter means fed simultaneously with said serial-in/serial-out shift register means for providing said stored credit data to said display means.

16. A system according to claim 10 and further including display means for displaying said decoded, stored credit and said altered credit and coupled with said shift register parallel-in/parallel-out means for receiving said decoded, stored credit data and said altered, stored credit data therefrom.

17. A system according to claim 1 or claim 3 wherein said record includes one track for carrying data and one track for carrying a clock, and wherein said decoding means and said encoding means are further operative for respectively decoding and encoding both said data and said clock for respectively reading and writing on said record.

18. A system according to claim 1 or claim 3 wherein said record includes a single track for carrying both said clock and data, and wherein said decoding means and said encoding means are further operative for decoding both said clock and said data and for encoding both said clock and said data for respectively reading and writing on said record.

19. A record operated control system for a vending machine including a record reading/writing apparatus having movable read/write head means for reading and writing data on a stationary record, said control system comprising: decoding means coupled with said read/write head means for decoding data read from said record thereby, a microprocessor including data storage means coupled with said decoding means for receiving and storing said decoded data, comparing means for comparing at least a portion of said stored data to predetermined data and for producing a compare signal if said data compare, and data altering means responsive to said compare signal for altering the stored data in accordance with the amount of credit required to vend a selected item, encoding means coupled with said storage means and with said read/write head means for causing writing of said altered stored data onto said record, said microprocessor further including vend enable means responsive to said compare signal and to said altering means and said encoding means for enabling the vending of said selected item only after said altering and said writing of said stored data and control means for controlling the sequence of operation of said control system in a predetermined sequence.

20. A system according to claim 2 wherein said control means includes means responsive to continued presence of a record in said record/writing means for enabling repeated cycles of operation of said control system.

21. A system according to claim 19 or claim 20 wherein said record carries credit data and validation data and wherein said decoding means is operative for decoding both said credit data and said validation data and said data storage means is operative for storing both the decoded credit data and the decoded validation data, and wherein said comparing means includes means for presetting desired validation data and for comparing said preset, desired validation data with the decoded and stored validation data and for producing said compare signal if said data compare.

22. A system according to claim 21 wherein said record further carries credit verification data corresponding in a predetermined fashion to said credit data, and wherein said decoding means is operative for decoding said credit verification data, wherein said data storage means includes means for receiving and storing said decoded credit verification data and wherein said comparing means further includes means for comparing said credit verification data with said credit data and for producing said compare signal only if the data compare.

23. A system according to claim 19 and further including display means coupled to said microprocessor for displaying the stored credit data.

24. A system according to claim 23 wherein said display means further includes means responsive to said compare signal for displaying said stored, altered credit data.

25. A system according to claim 19 or claim 20 wherein said record includes a single track for carrying both clock and data, and wherein said decoding means and said encoding means are further operative for decoding both said clock and said data and for encoding both said clock and said data for respectively reading and writing on said record.

* * * * *

UNITED STATES PATENT AND TRADEMARK OFFICE
CERTIFICATE OF CORRECTION

PATENT NO. : 4,361,754

DATED : November 30, 1982

INVENTOR(S) : WILLIAM R. HOSKINSON & EDWARD K. MIGUEL

It is certified that error appears in the above-identified patent and that said Letters Patent is hereby corrected as shown below:

Column 6, line 49, change "Q90" to --$\overline{Q}$90--;

Column 10, line 33, change "140" to --104--;

Column 18, line 35, change "the credit area" to --the credit data--;

Column 20, line 63, change "The Q and Q outputs" to --The Q and $\overline{Q}$ outputs--;

Column 26, line 12, change "said record/writing means" to --said record reading/writing means--.

Signed and Sealed this

Fifth Day of April 1983

[SEAL]

Attest:

GERALD J. MOSSINGHOFF

*Attesting Officer*  *Commissioner of Patents and Trademarks*